United States Patent
Hunts, Jr.

(10) Patent No.: US 9,956,493 B1
(45) Date of Patent: May 1, 2018

(54) SLIDE CONSTRUCTION ASSEMBLIES

(71) Applicant: SPARKLING SKY INTERNATIONAL LIMITED, Jordan, Kowloon (HK)

(72) Inventor: Larry Dean Hunts, Jr., Eagle Point, OR (US)

(73) Assignee: SPARKLING SKY INTERNATIONAL LIMITED, Kowloon (HK)

( * ) Notice: Subject to any disclaimer, the term of this patent is extended or adjusted under 35 U.S.C. 154(b) by 0 days. days.

(21) Appl. No.: 15/594,051

(22) Filed: May 12, 2017

(51) Int. Cl.
| | |
|---|---|
| *A63H 18/00* | (2006.01) |
| *A63F 7/00* | (2006.01) |
| *A63H 33/04* | (2006.01) |
| *A63H 18/02* | (2006.01) |
| *F16B 1/00* | (2006.01) |
| *A63H 33/00* | (2006.01) |
| *A63B 43/06* | (2006.01) |
| *A63F 7/28* | (2006.01) |
| *A63F 7/36* | (2006.01) |

(52) U.S. Cl.
CPC ........... *A63H 18/021* (2013.01); *A63B 43/06* (2013.01); *A63F 7/28* (2013.01); *A63F 7/3622* (2013.01); *A63H 18/02* (2013.01); *A63H 33/00* (2013.01); *A63H 33/046* (2013.01); *F16B 1/00* (2013.01); *A63F 2007/3662* (2013.01); *F16B 2001/0035* (2013.01)

(58) Field of Classification Search
CPC ...... A63H 18/00; A63H 18/02; A63H 33/046; A63H 33/26; A63H 18/06; A63F 7/3622; A63F 7/28; A63F 7/40; A63F 2007/3662

USPC .............. 446/85, 92, 129, 168, 171; 104/53; 473/570

See application file for complete search history.

(56) References Cited

U.S. PATENT DOCUMENTS

| | | |
|---|---|---|
| 2,500,180 A | 3/1950 | Hubbell |
| 2,795,893 A | 6/1957 | Vayo |
| 2,872,754 A | 2/1959 | Cronberger |

(Continued)

FOREIGN PATENT DOCUMENTS

| | | |
|---|---|---|
| EP | 0051576 | 5/1982 |
| JP | 3822062 | 6/2006 |

OTHER PUBLICATIONS

Machine Translation of EP0051576, 6pgs.

*Primary Examiner* — Alexander Niconovich
(74) *Attorney, Agent, or Firm* — Phillips Ryther & Winchester; Matthew D. Thayne

(57) ABSTRACT

Assemblies combining a structure, such as a structure defined by magnetic connector pieces, with a slide assembly. In some embodiments, the slide assembly may comprise a plurality of slide pieces configured to be coupled together so as to define a slide configured to receive and direct one or more slideable pieces, such as balls, therein. The slide assembly may further comprise a plurality of slide coupling members configured to couple at least a subset of the plurality of slide pieces to the structure. The plurality of slide pieces may comprise a plurality of coupling joints configured to couple two adjacent slide pieces of the plurality of slide pieces together. Each of at least a subset of the plurality of coupling joints may be configured to be positioned at the same location in at least one dimension with respect to an adjacent structure piece upon being coupled with the structure.

20 Claims, 20 Drawing Sheets

(56) References Cited

U.S. PATENT DOCUMENTS

| | | | |
|---|---|---|---|
| 2,939,243 A | 6/1960 | Duggar | |
| 3,184,882 A | 5/1965 | Vega | |
| 3,303,606 A | 2/1967 | Mann | |
| 3,946,516 A * | 3/1976 | Wirth | A63F 7/3622 446/117 |
| 3,994,076 A * | 11/1976 | Bertman | G09B 23/02 273/111 |
| 3,998,004 A | 12/1976 | Ehrlich | |
| 4,171,090 A * | 10/1979 | Eisenburg | A63F 7/3622 238/10 E |
| 4,238,905 A | 12/1980 | MacGraw, II | |
| 4,334,871 A | 6/1982 | Roane | |
| 4,401,960 A | 8/1983 | Uchikune et al. | |
| 4,462,596 A | 7/1984 | Yamamoto | |
| 4,932,917 A * | 6/1990 | Klitsner | A63F 7/3622 446/168 |
| 5,009,625 A | 4/1991 | Longuet-Higgins | |
| 5,048,704 A | 9/1991 | Takahashi | |
| 5,347,253 A | 9/1994 | Ogikubo | |
| 5,409,236 A | 4/1995 | Therrien | |
| 5,411,262 A | 5/1995 | Smith | |
| 5,451,177 A * | 9/1995 | Gilman | A63F 7/3622 403/338 |
| 3,254,440 A | 6/1996 | Duggar | |
| 5,709,581 A * | 1/1998 | Rothbarth | A63F 7/3622 446/171 |
| 5,746,638 A | 5/1998 | Shiraishi | |
| 5,785,573 A * | 7/1998 | Rothbarth | A63F 7/3622 446/171 |
| 5,892,174 A | 4/1999 | Hirawata | |
| 5,908,343 A * | 6/1999 | Rothbarth | A63F 7/3622 446/171 |
| 5,924,907 A * | 7/1999 | Tobin | A63F 7/386 446/118 |
| 6,024,626 A | 2/2000 | Mendelsohn | |
| 6,241,249 B1 | 6/2001 | Wang | |
| 6,428,432 B1 * | 8/2002 | Kachel | A63B 43/06 473/570 |
| 6,568,679 B1 * | 5/2003 | Sommer | A63F 7/042 273/118 R |
| 6,749,480 B1 | 6/2004 | Hunts | |
| 6,945,839 B2 * | 9/2005 | Quercetti | A63H 18/06 104/123 |
| 6,969,294 B2 | 11/2005 | Vicentelli | |
| 7,154,363 B2 * | 12/2006 | Hunts | H01F 7/0242 24/303 |
| 7,413,493 B2 | 8/2008 | Toht et al. | |
| 7,882,788 B2 * | 2/2011 | Sorenson | A63F 7/3622 104/123 |
| 8,458,863 B2 | 6/2013 | Hunts | |
| 8,475,226 B2 * | 7/2013 | Comfort | A63F 7/3622 446/168 |
| 9,409,097 B2 * | 8/2016 | Comfort | A63H 18/02 |
| 2007/0209543 A1 * | 9/2007 | Beaulieu | A63F 7/3622 104/53 |

* cited by examiner

SLIDE CONSTRUCTION ASSEMBLIES

SUMMARY

This disclosure relates to toy construction assemblies comprising a slide assembly, such as slide assemblies configured to be assembled adjacent to a structure, such as a structure defined by a plurality of magnetic connector pieces or other individual structure pieces. In preferred embodiments, the slide assembly may be configured to be coupled with an adjacent magnetic connector piece of the structure in a precise manner so as to allow for construction of a variety of possible alternative slides/structures.

In an example of a magnetic toy construction assembly according to some embodiments, the assembly may comprise a plurality of magnetic connector pieces, wherein each of the plurality of magnetic connector pieces is configured to be magnetically coupled with at least one adjacent magnetic connector piece so as to allow for construction of a structure. The assembly may further comprise a slide assembly configured to be coupled with the structure. The slide assembly may comprise a plurality of slide pieces configured to be coupled together so as to define a slide configured to receive and direct one or more slideable pieces, such as balls, therein. The slide assembly may further comprise a plurality of slide coupling members configured to couple at least a subset of the plurality of slide pieces to at least a subset of the plurality of magnetic connector pieces to allow the slide to be positioned adjacent to the structure. The slide pieces may comprise one or more angled slide pieces configured to direct the one or more slideable pieces downward and one or more non-angled slide pieces configured to direct the one or more slideable pieces therein laterally. One or more coupling joints may be configured to couple a first slide piece of the plurality of slide pieces to a second slide piece of the plurality of slide pieces.

Each of the one or more coupling joints may be configured to be positioned at the same location, or at least substantially the same location, in at least one dimension with respect to an adjacent magnetic connector piece following assembly. In some such embodiments, each of the one or more coupling joints may be configured to be positioned at the same location, or at least substantially the same location, in at least two dimensions with respect to an adjacent magnetic connector piece following assembly. In some such embodiments, each of the one or more coupling joints may be configured to be positioned at the same location, or at least substantially the same location, in three dimensions with respect to an adjacent magnetic connector piece following assembly. In some embodiments, the location may be a center of an adjacent magnetic connector piece, such that the coupling joints, or at least a portion of the coupling joints, is at least substantially centered in at least two dimensions with respect to an adjacent magnetic connector piece following assembly.

In some embodiments, at least a subset of the one or more coupling joints is configured to couple a first angled slide piece of the one or more angled slide pieces with a first non-angled slide piece of the one or more non-angled slide pieces.

In some embodiments, the slideable items may comprise balls having lights, such as LED lights. In some such embodiments, each of the balls may further comprise a motion sensor coupled with the light. The motion sensor may be configured to activate and/or deactivate the light depending upon detection of motion by the motion sensor.

In some embodiments, each at least a subset of the plurality of magnetic connector pieces may comprise an opening, such as a centralized opening and/or rectangular opening. In some such embodiments, each of the one or more coupling joints may be configured to be at least substantially centered in at least two dimensions with respect to an opening of an adjacent magnetic connector piece following assembly.

In some embodiments, at least a subset of the plurality of magnetic connector pieces may comprise a square shape. In some such embodiments, each of the plurality of magnetic connector pieces may comprise a square shape configured to be magnetically coupled with adjacent magnetic connector pieces so as to define cube-shaped construction pieces for the structure.

In an example of a toy construction assembly according to some embodiments, the assembly may comprise a structure comprising a plurality of openings formed therein, and a slide assembly configured to be coupled with the structure. The slide assembly may comprise a plurality of slide pieces configured to be coupled together so as to define a slide configured to receive and direct one or more slideable pieces therein; and a plurality of slide coupling members configured to couple at least a subset of the plurality of slide pieces to the structure to allow the slide to be positioned adjacent to the structure. The plurality of slide pieces may comprise a plurality of coupling joints configured to couple two adjacent slide pieces of the plurality of slide pieces together. Each of at least a subset of the plurality of coupling joints may be configured to be positioned at the same location, such as at least substantially centered, in at least one dimension with respect to an adjacent opening of the plurality of openings upon being coupled with the structure.

In some embodiments, the structure may be defined by a plurality of connector pieces, such as magnetic connector pieces, wherein each of the plurality of connector pieces is configured to be coupled with at least one adjacent connector piece to define the structure.

In some embodiments, the one or more slideable pieces may comprise balls, such as LED and/or motion-actuated balls.

In some embodiments, the structure may be defined by a plurality of connector pieces, wherein each of the plurality of connector pieces is configured to be coupled with at least one adjacent connector piece to define the structure. The plurality of coupling joints may comprise a first subset of coupling joints configured to direct a ball down an angled slide piece and a second subset of coupling joints configured to receive a ball from an angled slide piece. In some embodiments, each of the coupling joints of the first subset and the second subset may be configured to be coupled with an adjacent connector piece such that a center point or sharp transition point of a curve defined by the coupling joint is positioned at the same point relative to an adjacent connector piece of the structure.

In some embodiments, each of the coupling joints of the first subset and the second subset may be configured to be coupled with an adjacent connector piece such that at least a portion of a ball positioned at the center point or sharp transition point is positioned at a central location relative to an adjacent connector piece of the structure. In some such embodiments, each of at least a subset of the plurality of coupling joints is configured to be at least substantially centered (at least a portion of the joints) in at least two dimensions with respect to an adjacent opening of the plurality of openings upon being coupled with the structure.

In another example of a toy construction assembly according to other embodiments, the assembly may comprise a structure defined by a plurality of structure pieces and a slide assembly configured to be coupled with the structure. The slide assembly may comprise a plurality of slide pieces configured to be coupled together so as to define a slide configured to receive and direct one or more slideable pieces therein and a plurality of slide coupling members configured to couple the slide assembly to the structure. The plurality of slide coupling members may comprise one or more angled slide pieces configured to direct the one or more slideable pieces downward and one or more non-angled slide pieces configured to direct the one or more slideable pieces therein laterally. Each of the one or more non-angled slide pieces may be configured to be coupled with the structure such that each of the one or more non-angled slide pieces directs the one or more slideable pieces along the slide in an at least substantially central position relative to an adjacent structure piece in a vertical direction relative to the adjacent structure piece.

In some embodiments, each of the one or more angled slide pieces is configured to be coupled with an adjacent non-angled slide piece of the one or more non-angled slide pieces at an at least substantially central location in at least two dimensions with respect to a structure piece of the plurality of structure pieces. In some such embodiments, each of the one or more angled slide pieces is configured to be coupled with an adjacent non-angled slide piece of the one or more non-angled slide pieces at an at least substantially central location in three dimensions with respect to a structure piece of the plurality of structure pieces.

In some embodiments, the structure may be defined by a plurality of magnetic connector pieces. Each of the plurality of magnetic connector pieces may be configured to be magnetically coupled with at least one adjacent magnetic connector piece so as to allow for construction of the structure.

In some embodiments, each of the plurality of magnetic connector pieces may comprise an opening. In some such embodiments, each of the one or more angled slide pieces may be configured to be coupled with an adjacent non-angled slide piece of the one or more non-angled slide pieces at an at least substantially central location with respect to an opening of an adjacent magnetic connector piece upon being coupled with the structure.

In some embodiments, the slide assembly and the structure pieces may be configured such that at least a subset of the slide pieces (such as each of the straight pieces defining the slide, for example) are configured to be positioned at a consistent distance from an adjacent structure piece of the plurality of structure pieces upon assembly.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

Figure 1:
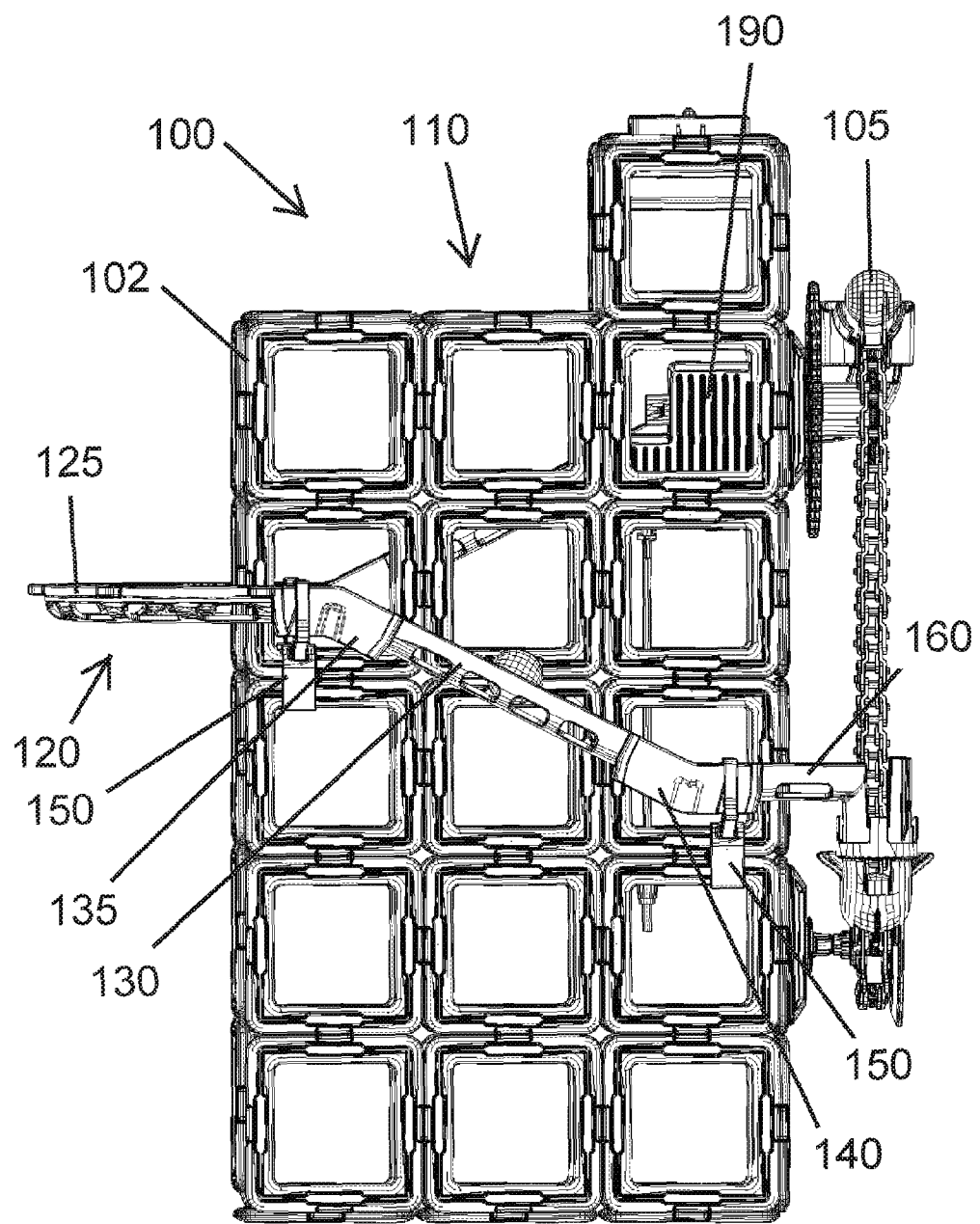
FIG. 1 is a side elevation view of a magnetic construction assembly including a slide assembly and a structure defined by a plurality of magnetic connector pieces according to some embodiments.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Described herein are embodiments of slide assemblies, such as ball run/slide assemblies or other slideable item run/slide assemblies. In preferred embodiments, these assemblies may be configured to be coupled with construction assemblies, such as magnetic construction assemblies, such that a variety of towers or other structures may be constructed in order to support the slide assembly. In this manner, a wide variety of unique slide assemblies may be constructed along with the variety of supporting structures by connecting various pieces of the assemblies together in various ways.

In some embodiments and implementations, the construction assembly may comprise a plurality of magnetic connector pieces that may be configured to be coupled with one another in a variety of ways to form various geometric objects that may be used to construct a tower or other structure, which, as mentioned above, may be used to support a slide assembly. In some such embodiments, each of the magnetic connector pieces may comprise one or more magnets, such as preferably neodymium magnets or other high-strength/flux magnets, positioned within one or more magnet housings such that the magnet(s) can rotate within the magnet housing(s). These various magnets may be configured to rotate with respect to one another in order to align opposite polarities and magnetically link two or more of the various magnetic connector pieces together, such as is described in detail in U.S. Pat. No. 8,458,863 titled "MAGNETIC CONNECTOR APPARATUS AND RELATED SYSTEMS AND METHODS," which patent is hereby incorporated herein by reference in its entirety.

Although preferred embodiments use magnetic connector pieces, it is contemplated that alternative construction pieces may be used in other embodiments. For example, in some embodiments, construction pieces may comprise other means for coupling, such as snap fit, hinges, latches, tabs, slots, adhesives, and the like. In other embodiments, a structure may be provided for coupling with a slide assembly that need not comprise individual construction items.

In some embodiments, the magnet housing(s) may be configured to inhibit removal of the magnets for safety purposes. Because of the high strength of neodymium magnets and other similar magnets, it may be desirable to restrict access to such magnets to users of a magnetic connector apparatus, particularly children. It may therefore be desirable to construct the magnet housing(s) in such a manner that access to the magnets contained within such housings is restricted. This may be done in a variety of ways, as also described in greater detail in U.S. Pat. No. 8,458,863.

One or more of the magnetic connector pieces may be magnetically coupled with a connection edge of another magnetic connector piece to allow for construction of various towers and/or structures having different shapes, sizes, and/or configurations. In some embodiments and implementations, at least a subset of the connector pieces may be formed in the shape of a rectangle, as discussed in greater detail below. In some such embodiments, one or more of these connector pieces may comprise an opening formed in the center of the rectangle. Of course, other shapes are contemplated, such as triangles or other polygons, for example, and one or more connector pieces formed in these shapes may, in some embodiments, similarly comprise an opening. This opening may have the same, or at least substantially the same, shape as the outer perimeter of the connector piece if desired.

By providing connector pieces having the shape of rectangles, polygons, or other geometric forms, and by coupling them together as described herein, three-dimensional structures may be created from multiple connector pieces that may be used to form building blocks/components of the structure. For example, when square or other rectangular magnetic connector pieces are used, hollow cubes or other cuboids or rectangular prisms may be stacked on top of one another to define a tower/structure. Of course, other shapes may be used, both in terms of the individual connector pieces and the three-dimensional building structures they define. For example, pyramids, triangular prisms, tetrahedrons, etc., may be used to form various structures to which a slide assembly may be coupled, as discussed in greater detail below.

As also described in greater detail below, in some embodiments, each magnet used in each magnetic connector piece may comprise a multi-pole magnet assembly. Such an assembly may comprise a first half and a second half extending substantially along a longitudinal axis. The first half may comprise at least two magnetic sections of alternating polarity and the second half may comprise a corresponding number of magnetic sections. Each magnetic section in the second half may have a polarity opposite that of an adjacent magnetic section in the first half such that the polarity of the magnet alternates along its length.

However, other types of magnets may be used in alternative embodiments. For example, in some embodiments, the magnets need not be configured such that they alternate in polarity along their respective lengths. Instead, magnets with just two poles may be used, such as those disclosed in U.S. Pat. No. 7,154,363 titled "Magnetic Connector Apparatus," for example.

The magnets may, in some embodiments, be positioned in a housing having a body member comprising a cylindrical cavity. The magnet may be positioned within the cylindrical cavity. The magnet may be rotatable within the cavity or, alternatively, the magnet may be rotatable within another enclosure positioned within the cavity. As still another alternative, the magnet may be positioned within another enclosure and the enclosure/magnet combination may be rotatable with respect to the magnet housing.

The magnetic connector pieces may comprise a plurality of magnets/magnet housings, each of which may be positioned along a connection edge of the apparatus such that multiple edges of the piece may be used to magnetically couple the piece with another magnetic connector piece. Each magnet positioned within each of the magnet housings may be configured such that the magnet can rotate within its respective magnet housing such that opposing polarities of the magnets can be aligned and lock two or more magnet connector pieces together.

In some embodiments, the magnet(s) may be configured to rotate within and with respect to an enclosure. In alternative embodiments, the enclosure encasing the magnet(s) may itself be configured to rotate. Enclosures and/or magnetic assemblies may be configured to rotate with respect to one another in order to align opposite polarities. In some embodiments, the magnet(s) rotate with respect to the enclosures. In other embodiments, the magnet(s) may be fixed within their respective enclosures and the enclosures rotate with respect to one another in order to align the polarities of the encased magnetic assemblies.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, an "embodiment" may be a system, an article of manufacture, a method, or a product of a process.

The components of the embodiments, as generally described and illustrated in the figures herein, could be arranged and designed in a wide variety of different configurations. Some of the infrastructure and manufacturing processes that can be used with embodiments disclosed herein are already available. Accordingly, well-known structures and manufacturing processes associated with magnets, connectors, plastics, forms, metals, composites, and the like, have not been shown or described in detail to avoid unnecessarily obscuring descriptions of the present exemplary embodiments. In addition, the steps of the described methods do not necessarily need to be executed in any specific order, or even sequentially, nor need the steps be executed only once, unless otherwise specified.

The embodiments of the disclosure are best understood and will now be described in greater detail with reference to the accompanying drawings, wherein like parts are designated by like numerals throughout. In the following description, numerous details are provided to give a thorough understanding of various embodiments. However, the embodiments disclosed herein can be practiced without one or more of the specific details, or with other methods, components, materials, etc. In other instances, well-known structures, materials, or operations are not shown or described in detail to avoid obscuring aspects of this disclosure.

Figure 2:
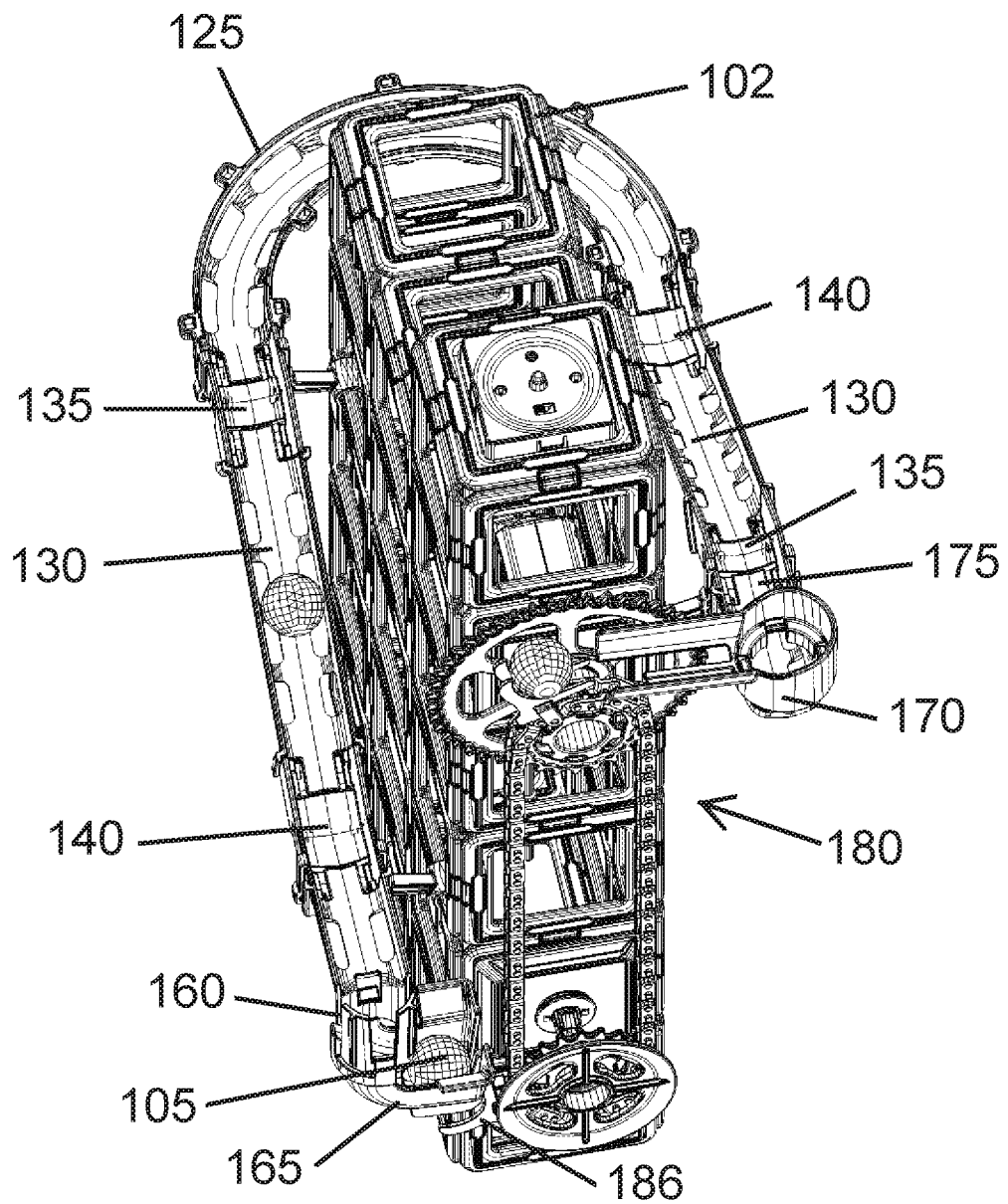
FIG. 2 is a perspective view of the magnetic construction assembly of FIG. 1.
Figure 3:
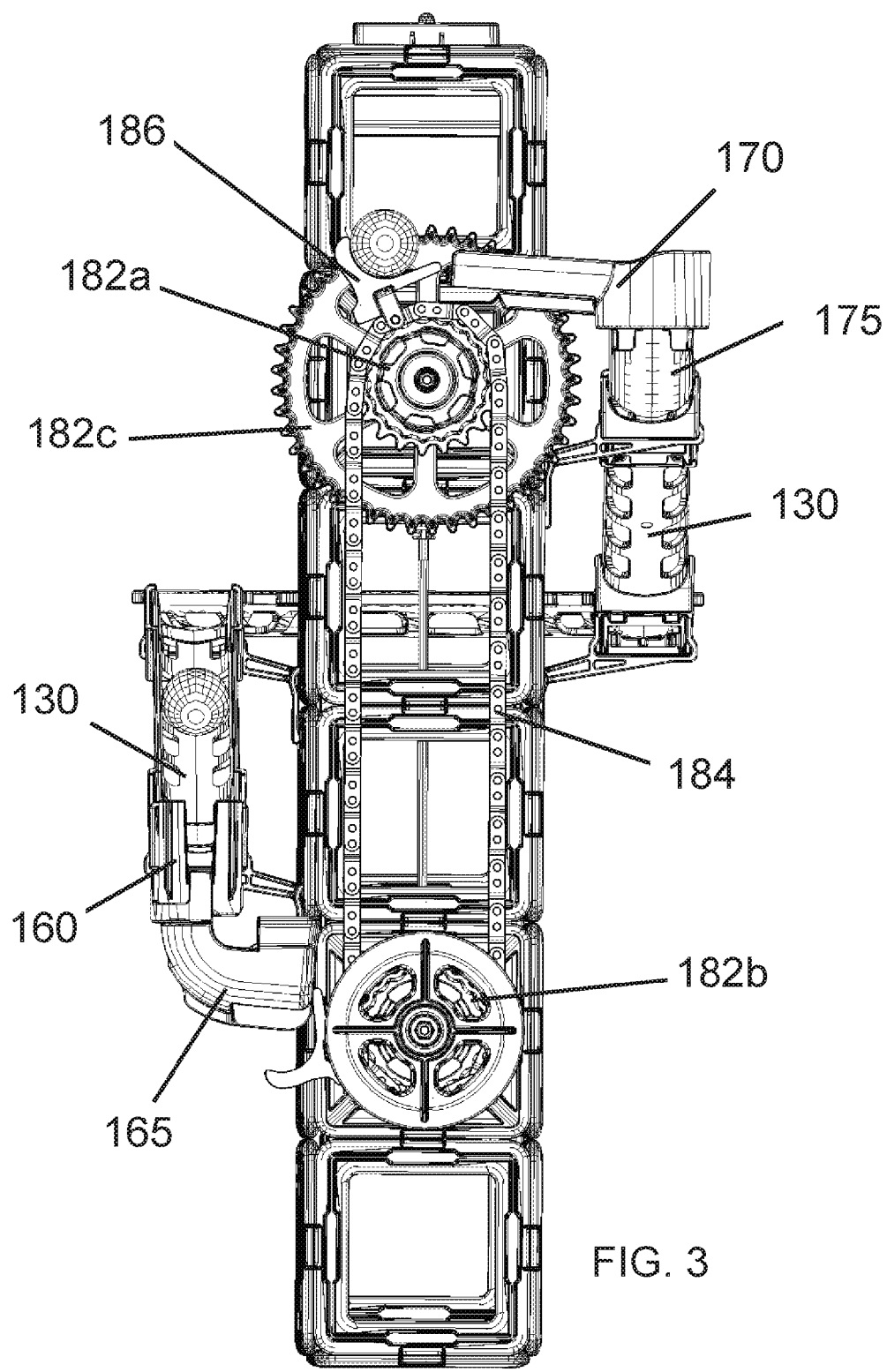
FIG. 3 is a side elevation view of the magnetic construction assembly of FIGS. 1 and 2.
Figure 4:
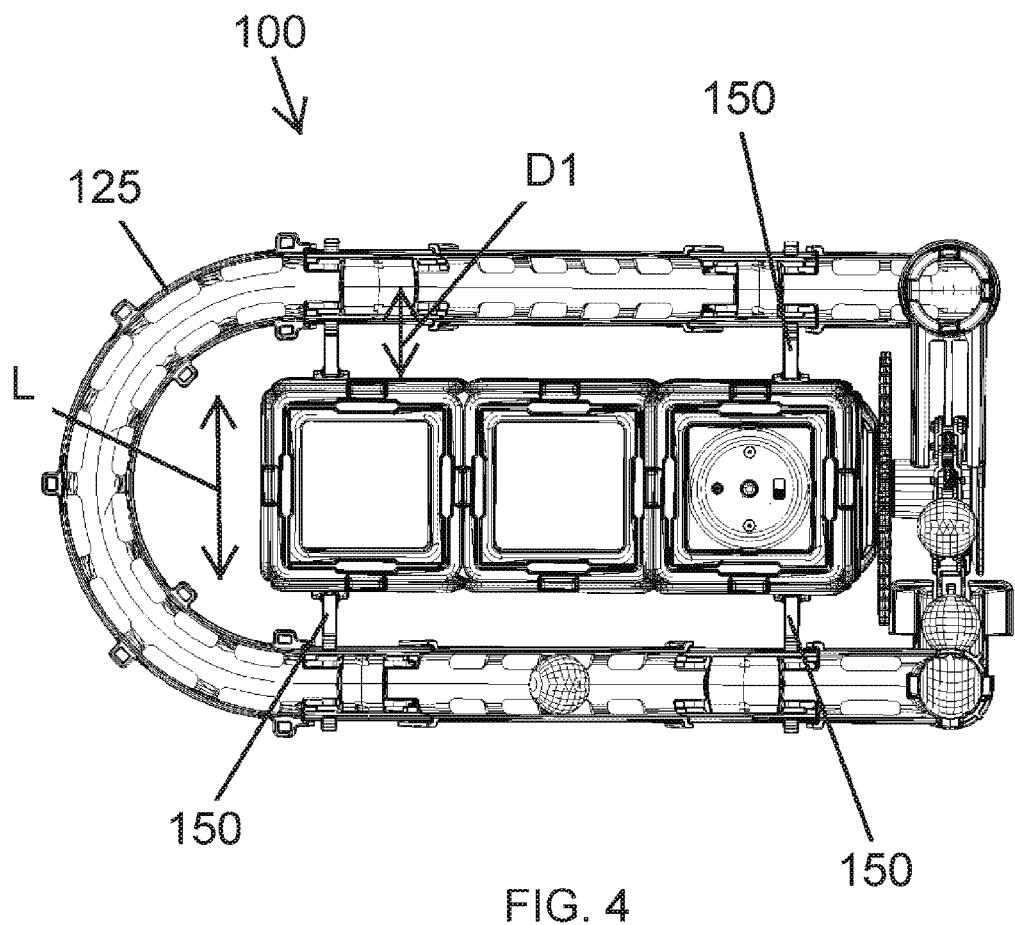
FIG. 4 is a top plan view of the magnetic construction assembly of FIGS. 1-3.

FIG. 1 is a side elevation view of a magnetic construction assembly 100 including a slide assembly 120 defined by a plurality of slide pieces and a structure 110 defined by a plurality of structure pieces 102 according to some embodiments. FIG. 2 is a perspective view of magnetic construction assembly 100. FIG. 3 is a side elevation view of magnetic construction assembly 100. And FIG. 4 is a top plan view of magnetic construction assembly 100.

As shown in FIGS. 1-4, the structure pieces of the depicted embodiment comprise magnetic connector pieces 102. As described above, and as shown in these figures, at least a subset of magnetic connector pieces 102 define rectangular shapes that, when coupled together magnetically along respective edges, can define three-dimensional building blocks to build a tower or other structure.

As also shown in these figures, slide assembly 120 comprises a plurality of individual slide pieces used to define a slide for one or more balls 105. Although balls 105 are used in preferred embodiments, alternative embodiments are contemplated in which other rollable or otherwise slideable items may be used, such as items with wheels or items with sufficiently low friction to slide without rolling, for example.

Preferably, at least a subset (in some embodiments, each) of the slide pieces are configured to be coupled with one another in a snap-fit manner to define a variety of different slides having different shapes, sizes, and/or slide characteristics. For example, slide assembly 120 may comprise one or more curved slide pieces 125. As best seen in FIG. 2, curved slide piece(s) 125 may allow for directing a ball 105 or another slideable item from one side of structure 110 to the opposite side of structure 110. Although only one curved slide piece 125 is depicted in the accompanying figures, those of ordinary skill in the art, after having received the benefit of this disclosure, will appreciate that a variety of curved slide pieces, such as curved slide pieces curving in different directions, having different radii of curvature, etc., may be provided in other embodiments so as, for example, to allow the slide to extend about structures of other sizes, extend through or between structures, or to extend away from a structure and back towards the structure in a variety of possible ways.

One or more straight slide pieces, such as straight slide pieces 130, may also be provided. As with curved slide piece(s) 125, a variety of straight slide pieces 130 may be provided as desired. For example, a variety of different straight slide pieces having different lengths may be provided.

One or more coupling joints may also be provided, which may be used to couple two slide pieces together. For example, one or more downwardly-angled coupling joints 135 may be provided that are configured to direct a ball 105 or another slideable item down an angled slide piece (a slide piece allowing a ball 105 or other slideable item to fall by gravity) from a non-angled slide piece (a slide piece extending laterally, or at least substantially laterally) rather than downward). Similarly, one or more laterally-angled coupling joints 140 may be provided that are configured to receive a ball 105 or another slideable item from an angled slide piece and direct it laterally.

Figure 7:
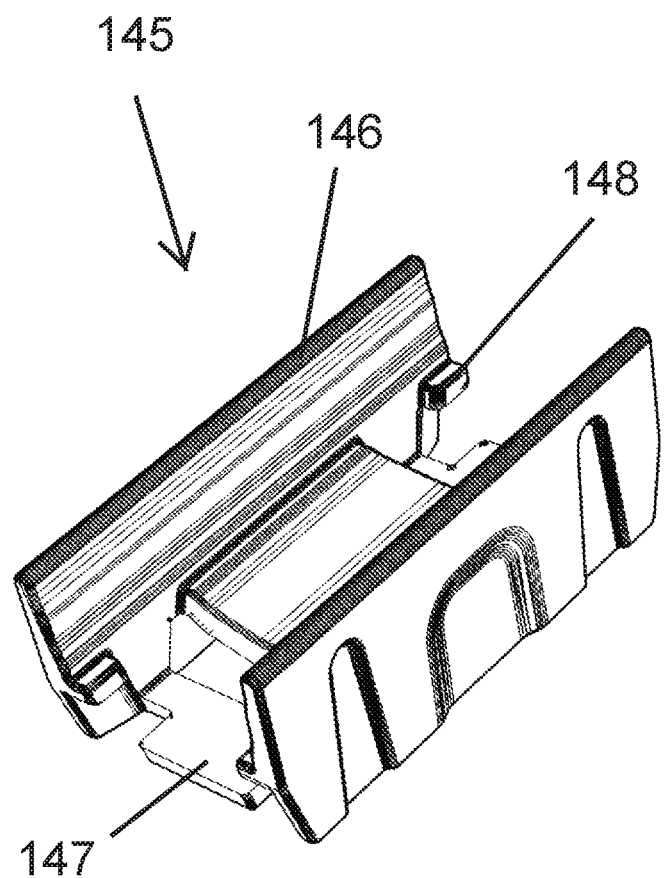
FIG. 7 is a perspective view of a straight coupling joint of a slide assembly according to some embodiments.
Figure 18:
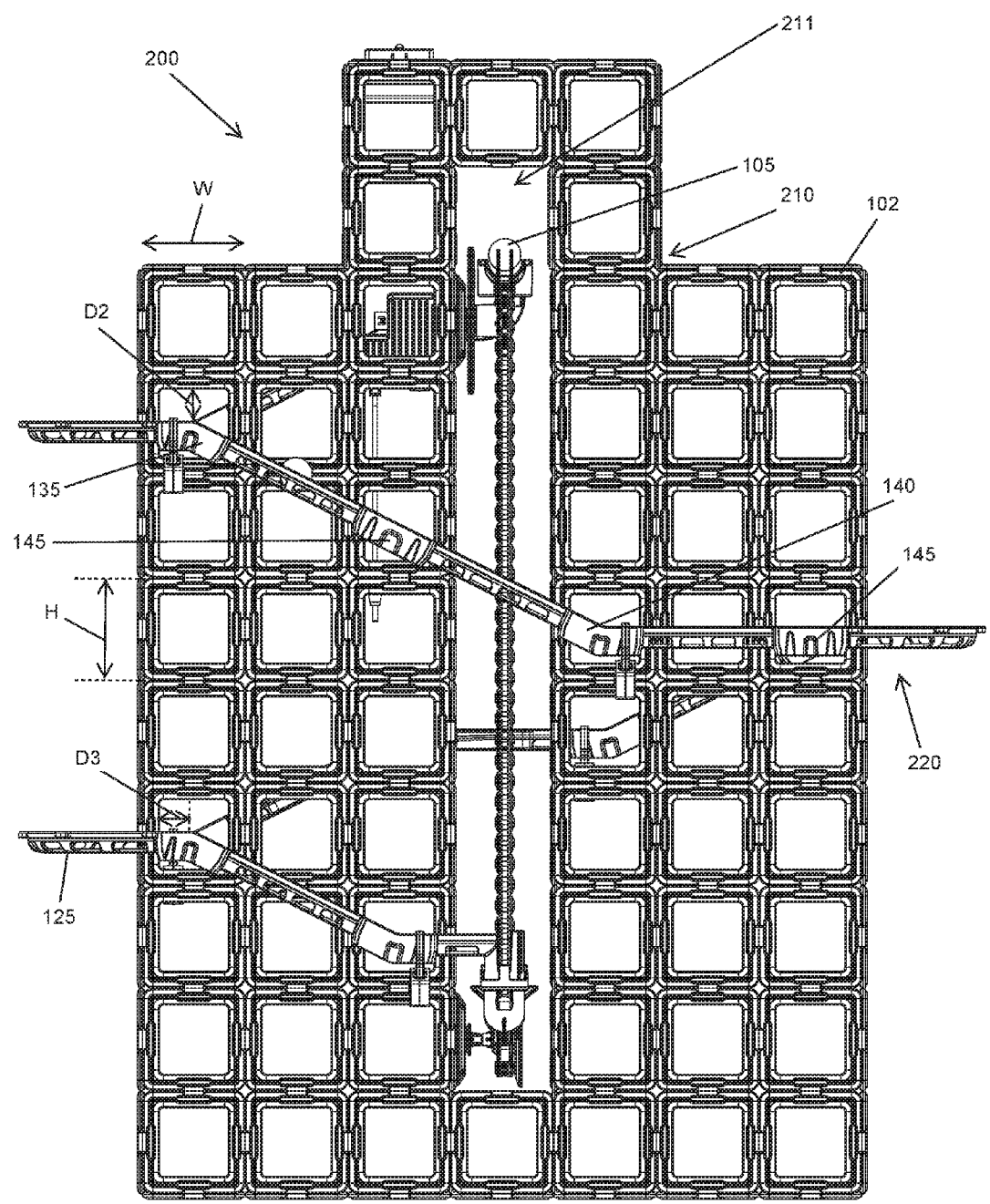
FIG. 18 is a side elevation view of a magnetic construction assembly including a slide assembly and a structure defined by a plurality of magnetic connector pieces according to another embodiment illustrating how some embodiments may allow for various pieces of the slide assembly to extend through an opening in the structure and/or through openings defined by adjacent structures.

Although not shown in FIGS. 1-4, some embodiments may also comprise a straight coupling joint, such as straight coupling joint 145 shown in FIG. 7. This may be provided to allow for coupling two non-angled slide pieces to one another, as shown in FIG. 18.

Slide assembly 120 further comprises a plurality of slide coupling members 150. Slide coupling members 150 are configured to couple one or more of the slide pieces to one or more of the magnetic connector pieces 102 to allow the slide to be positioned adjacent to the structure 110 and be supported by the structure 110 in a variety of possible configurations. In the depicted embodiments, slide coupling members 150 are configured to be directly coupled with coupling joints, such as coupling joints 135 and 140, at one end and with two adjacent magnetic connector pieces 102 at the opposite end. More particularly, as best seen in FIGS. 1 and 3, and as discussed in greater detail below in connection with FIG. 10, a first end of slide coupling member 150 is configured to slide over and engage a portion (preferably a non-angled and/or laterally extending portion) of a coupling joint and a second end of slide coupling member 150 is configured to slide over and engage an adjacent magnetic connector piece 102. In the depicted embodiment, the second end of slide coupling member 150 is elongated and therefore also configured to slide over and engage another adjacent magnetic connector piece 102 positioned below the first magnetic connector piece 102.

However, a variety of alternative configurations are contemplated. For example, slide coupling members 150 may instead be configured to directly engage another component of slide assembly 120, such as straight slide piece(s) 130 and/or curved slide piece(s) 125. Similarly, slide coupling members 150 may, in some embodiments, be configured to only directly engage a single connector piece 102 (although engaging two connector pieces may be preferred to add stability to the constructed assembly).

Slide assembly 120 further comprises a drop tube connector piece 160, which may be used to deliver a ball 105 or other slideable item from a portion of slide assembly 120, such as coupling joint 140, to a lift assembly 180 for lifting the ball 105 from the bottom portion of slide assembly 120 to the top portion of slide assembly 120. By providing a lift assembly 180, the balls 105 or other slideable items may be sent through slide assembly 120 in a repeating cycle. In certain preferred embodiments, lift assembly 180 may comprise a motor and/or motor assembly 190. In such embodiments, the balls 105 may be automatically lifted from the bottom of the slide defined by slide assembly 120 to the top of the slide automatically.

In the depicted embodiment, lift assembly 180 further comprises a pair of sprockets 182a and 182b coupled with a chain 184. Sprockets 182a and 182b are driven by motor assembly 190. In addition, one or more lift pieces 186 may be coupled with chain 184 so as to facilitate transfer of balls 105 from the bottom to the top of the slide. As best seen in FIG. 2, another component may be provided to retain the balls/slideable items 105 to await engagement by a lift piece 186 as the chain 184 moves along sprockets 182*a*/182*b*. A third, larger sprocket 182*c* is provided at the upper end of lift assembly 180 adjacent to sprocket 182*a*.

More particularly, in the depicted embodiment, this component comprises a lift transfer piece 165 that is configured to be coupled with drop tube connector piece 160. As discussed in greater detail below, lift transfer piece 165 is configured to hold ball 105, or another slideable item, in a stationary position until a lift piece 186 extends through one or more openings formed in the lift transfer piece 165, engages a ball 105, and lifts the ball 105 out of lift transfer piece 165 and up to the top of the slide.

Once at the top of the slide, balls 105 may be delivered into a ball receiver piece 170, which may, in turn, be coupled with an unloading connector piece 175. Unloading connector piece 175 may be coupled at its opposite end to one of the other elements of the slide assembly 120, such as a coupling joint (coupling joints 135 or 140, for example) or a slide piece, such as straight slide piece 130.

As best shown in FIG. 3, the connector pieces used to deliver the balls 105 into and out of slide assembly 120 to/from lift assembly 180, namely ball receiver piece 170 and drop tube connector piece 160, may be configured to be coupled with an adjacent slide assembly piece in a plurality of directions. For example, in some embodiments, these connector pieces may be configured to extend from an adjacent slide assembly piece in a straight, right, or left direction relative to the slide. In addition, preferably each "level" of the slide assembly, in some embodiments including the delivery/pick-up positions of the slide assembly, may at the same, or at least substantially the same, location relative to an adjacent magnetic connector piece or other structural element. These features, alone or in combination with one or more of the various dimensional aspects of certain embodiments discussed herein, may allow for the slide assembly 120 to function in conjunction with the structure 110 similar to a puzzle where each of the various slide pieces couple together and the slide assembly 120 maintains a coupling with the structure 110 without ending up with parts that are misaligned and therefore will not connect.

In some preferred embodiments, the slide assembly 120 may be specifically configured to operate in connection with the magnetic connector pieces 102 or other structure pieces. For example, one or more of the elements of the slide assembly 120 (in some embodiments, all elements) may be configured to be coupled with one or more elements of a structure, such as one or more of the magnetic connector pieces 102, such that a user may extend the slide along various portions of the structure in a variety of different ways and still be able to couple the slide to the structure.

This may be accomplished in some embodiments by configuring the assembly such that each of at least a subset of elements of the slide assembly 120, such as at least a subset of coupling joints (or, in some embodiments, all coupling joints), are configured to be coupled with an adjacent connector piece such that they are positioned at the same, or at least substantially the same, location with respect to the adjacent connector piece. For example, a center point of a curve or a sharp transition point defined by the coupling joint may be positioned at the same point relative to an adjacent connector piece of the structure. In some embodiments, each of at least a subset of the plurality of coupling joints and/or other pieces of the slide assembly may be configured to be at least substantially centered in at least one dimension with respect to a particular feature of an adjacent connector piece, such as an opening of an adjacent connector piece. In some such embodiments, the each of at least a subset of the plurality of coupling joints and/or other pieces of the slide assembly may be configured to be at least substantially centered in at least two dimensions with respect to a particular feature of an adjacent connector piece, such as an opening of an adjacent connector piece. In some such embodiments, each of at least a subset of the plurality of coupling joints and/or other pieces of the slide assembly may be configured to be at least substantially centered in three dimensions with respect to a particular feature of an adjacent connector piece, such as an opening of an adjacent connector piece.

In some embodiments, one or more of the slide pieces and/or other elements of the slide assembly may be configured to be coupled with the structure/connector pieces such that the slide pieces (such as all non-angled slide pieces, for example) direct the balls or other slideable pieces along the slide along the same location in a vertical direction relative to adjacent structure pieces. In some such embodiments, one or more of the slide pieces and/or other elements of the slide assembly may be configured to be coupled with the structure/connector pieces such that the slide pieces (such as all non-angled slide pieces, for example) direct the balls or other slideable pieces along the slide along an at least substantially central position vertically relative to an adjacent structure piece. In some such embodiments, this location may correspond with the center of an opening formed within the adjacent structure piece.

As shown in FIG. 4, some of these characteristics that allow the slide assembly 120 to be constructed in a variety of different ways with respect to the structure pieces may apply to one or both of the dimensions viewable from atop the structure. For example, the assembly may be configured such that at least the straight portions of the slide extend adjacent to the structure at the same distance D1, which may be measured from the center of the adjacent slide piece. In some embodiments, distance D1 may be one-half, or at least approximately one-half, of the length L of the magnetic connector pieces 102. By providing consistent dimensions in this manner, and/or in other manners discussed below, the slide assembly 120 may be configured to consistently couple together, and to couple with structure 110 and/or the pieces 102 of structure 110 in a wide variety of ways without providing a frustrating inability to properly connect the slide. In addition, in embodiments having structural pieces with central openings, this may allow for part of the slide to extend through one or more of these openings, as also discussed in greater detail below.

Figure 5:
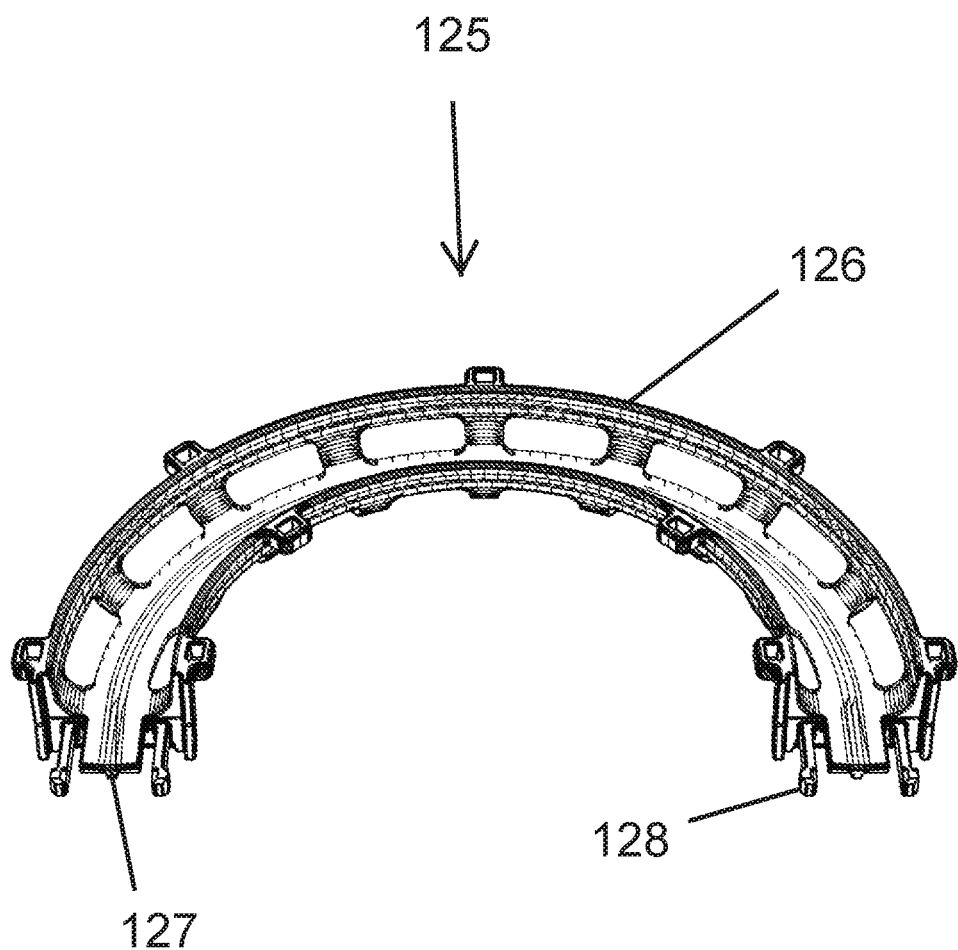
FIG. 5 is a perspective view of a curved slide piece of a slide assembly according to some embodiments.

FIG. 5 is a perspective view of a curved slide piece 125 of slide assembly 120. As shown in this figure, curved slide piece 125 comprises a pair of opposing rails 126 configured to retain a ball 105 which the ball 105 rolls within the slide piece 125. Curved slide piece 125 further comprises at each of its opposing ends means for coupling with an adjacent slide piece comprising a tab 127 and two flexible prongs 128.

Figure 6:
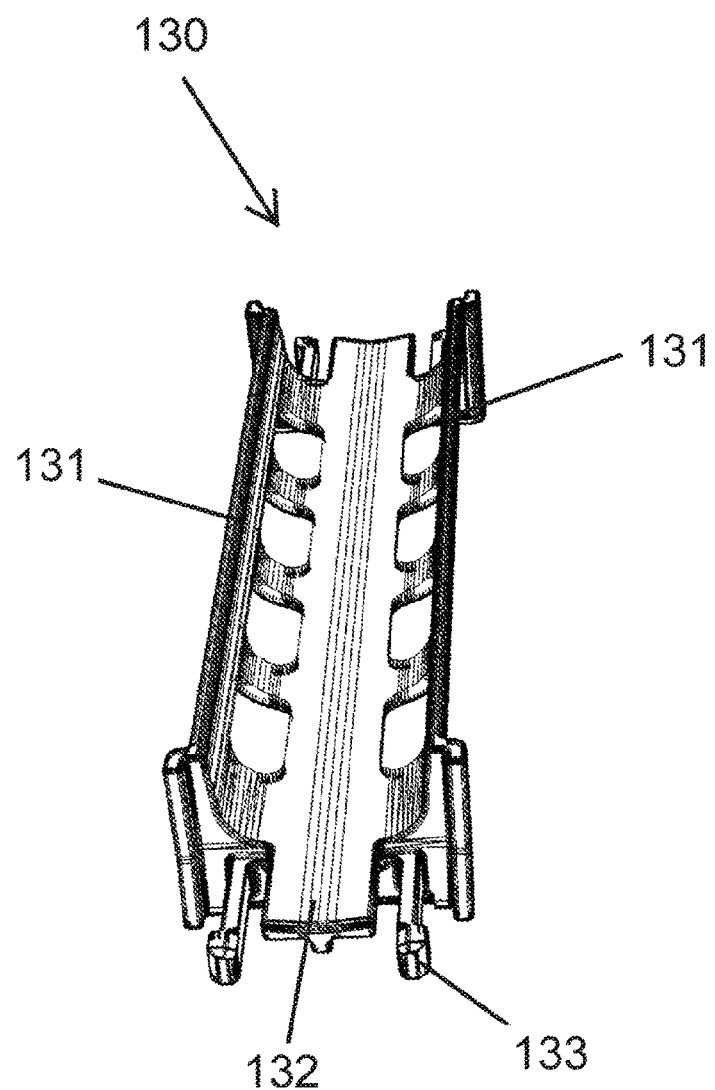
FIG. 6 is a perspective view of a straight slide piece of a slide assembly according to some embodiments.

FIG. 6 is a perspective view of a straight slide piece 130 of slide assembly 120. As shown in this figure, straight slide piece 130 also comprises a pair of opposing rails 131 and means for coupling with an adjacent slide piece at both opposing ends comprising a tab 132 and two flexible prongs 133.

FIG. 7 is a perspective view of a straight coupling joint 145 of slide assembly 120. As shown in this figure, straight coupling joint 145 comprises a pair of opposing rails 146 and means for coupling with an adjacent slide piece at both opposing ends comprising a tab 147 and a pair of ledges 148 configured to engage the prongs of an adjacent slide piece.

Figure 8:
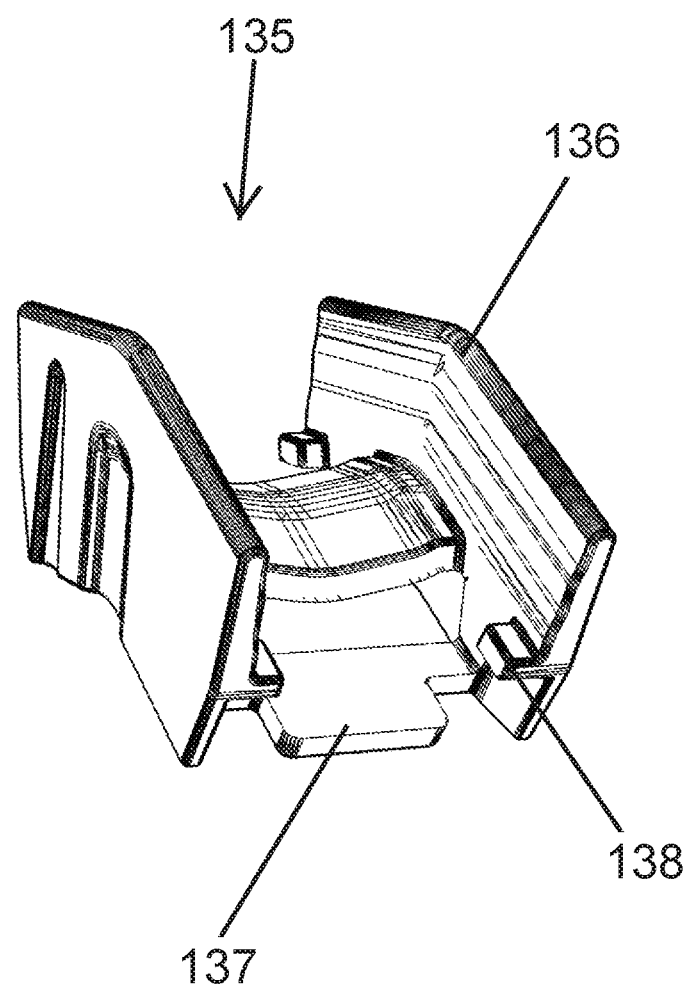
FIG. 8 is a perspective view of a first angled coupling joint of a slide assembly according to some embodiments.

FIG. 8 is a perspective view of a first angled coupling joint 135 of slide assembly 120. As previously mentioned, and as depicted in FIG. 1, angled coupling joint 135 is configured to join a lateral/horizontal slide piece at its upper (relative to the direction of the balls 105 within the slide) end with an angled slide piece at its lower end. As shown in this figure, first angled coupling joint 135 comprises a pair of opposing rails 136 and means for coupling with an adjacent slide piece at both opposing ends comprising a tab 137 and a pair of ledges 138 configured to engage the prongs of an adjacent slide piece.

Figure 9:
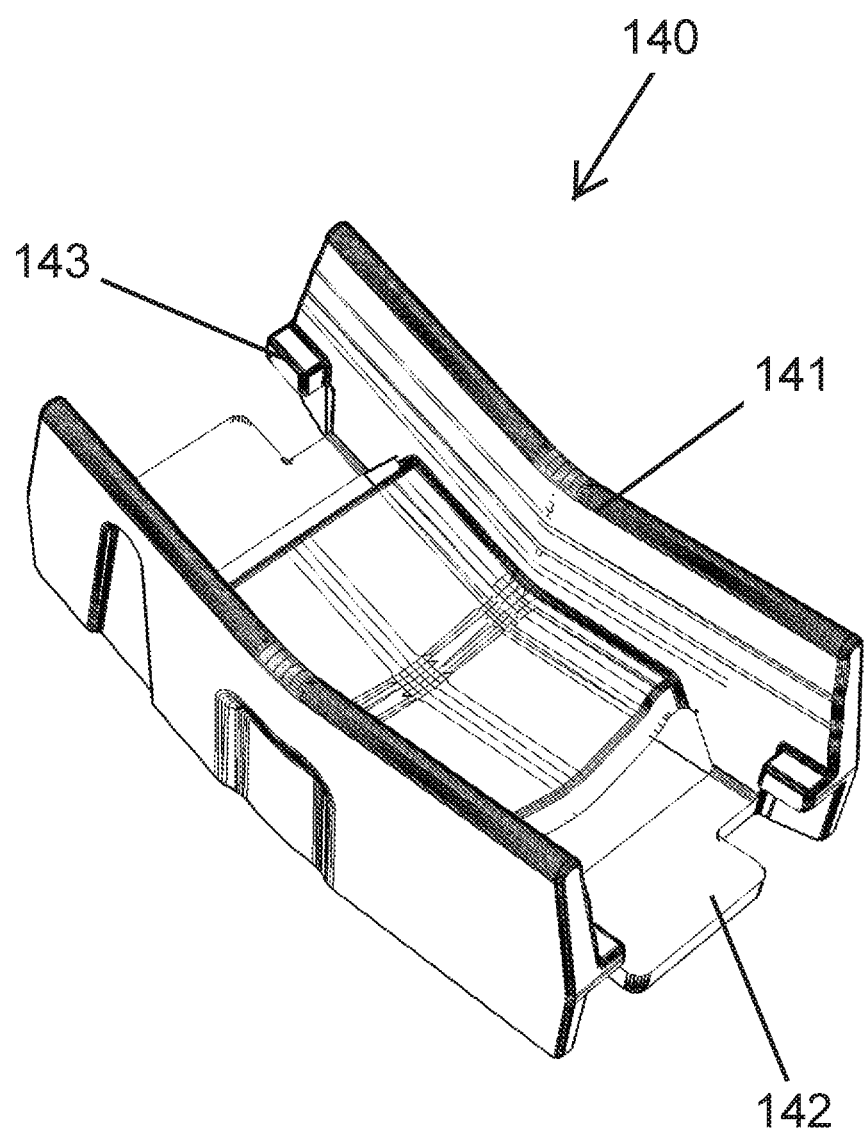
FIG. 9 is a perspective view of a second angled coupling joint of a slide assembly according to some embodiments.

FIG. 9 is a perspective view of a second angled coupling joint 140 of slide assembly 120. As previously mentioned, and as depicted in FIG. 1, angled coupling joint 140 is configured to join a lateral/horizontal slide piece at its lower (relative to the direction of the balls 105 within the slide) end with an angled slide piece at its upper end. As shown in this figure, second angled coupling joint 140 comprises a pair of opposing rails 141 and means for coupling with an adjacent slide piece at both opposing ends comprising a tab 142 and a pair of ledges 143 configured to engage the prongs of an adjacent slide piece.

Figure 10:
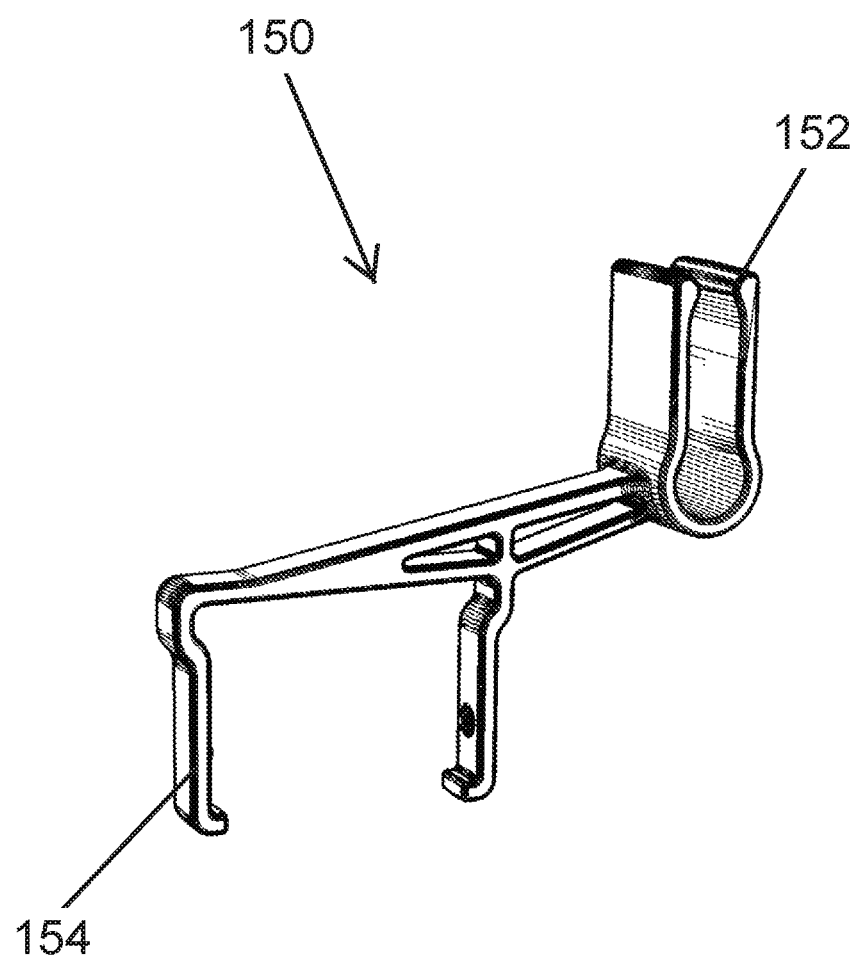
FIG. 10 is a perspective view of a slide coupling member according to some embodiments.

FIG. 10 is a perspective view of a slide coupling member 150 of construction assembly 100. As shown in this figure, slide coupling member 150 comprises a first pair of engagement members 152 at a first end and a second pair of engagement members 154 at a second end opposite from the first end. In preferred embodiments, the first and second pairs of engagement members 152 and 154, respectively, may each comprise resiliently flexible engagement members that are configured to engage distinct portions of assembly 100.

More particularly, engagement members 152 are configured to engage at least one (and preferably two) adjacent structure piece, such as a magnetic connector piece 102, of structure 110. Engagement members 154 are configured to engage one or more pieces of slide assembly 120. As mentioned elsewhere in this disclosure, slide coupling members 150 may be specifically configured to space apart and/or align various elements of structure 110 with various elements of slide assembly 120 in a precise manner so as to allow for a variety of slide/structure configurations.

Figure 11:
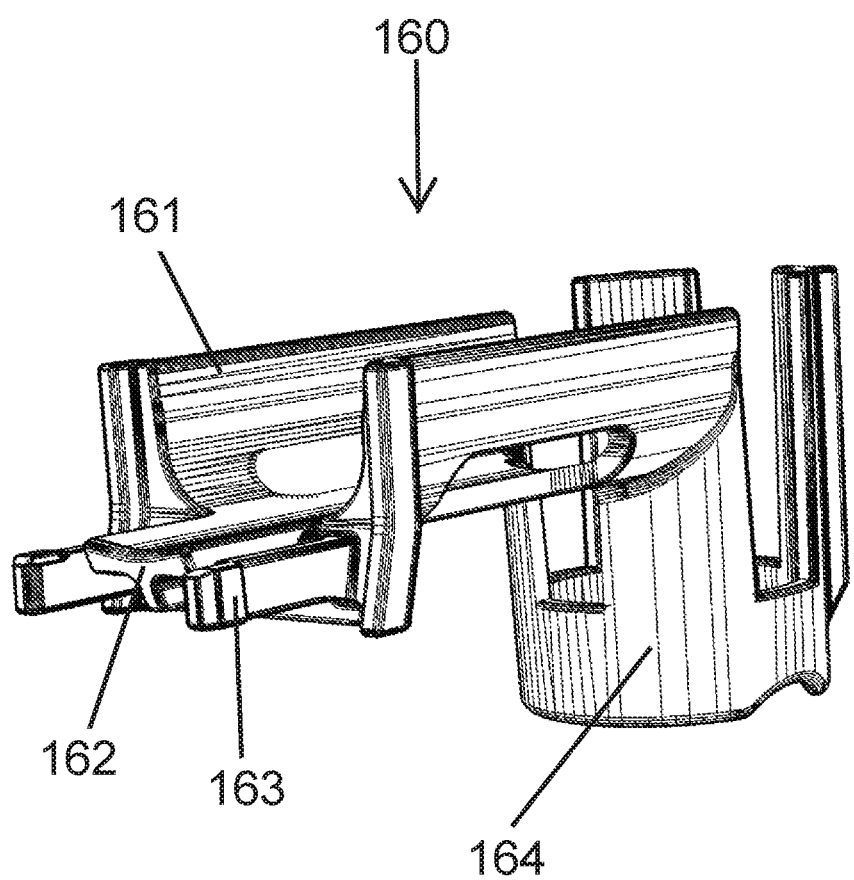
FIG. 11 is a perspective view of a drop tube connector piece of a slide assembly according to some embodiments.

FIG. 11 is a perspective view of a drop tube connector piece 160 of slide assembly 120. As shown in this figure, drop tube connector piece 160 comprises a pair of opposing rails 161 along a first portion and means for coupling with an adjacent slide piece at one end of drop tube connector piece 160 at the terminal end of the first portion. The means for coupling with an adjacent slide piece again comprises a tab 162 and a pair of prongs 163 configured to engage a corresponding feature, such as a pair of ledges, of an adjacent slide piece. A second portion of drop tube connector piece 160 comprises a tube 164 that, as previously described, may be configured to receive a ball 105 or another slideable item and ultimately deliver the ball 105 to a lift assembly at the end of the slide. Tube 164 may be slotted, as shown in FIG. 11, to facilitate coupling with another slide piece, as described below.

Figure 12:
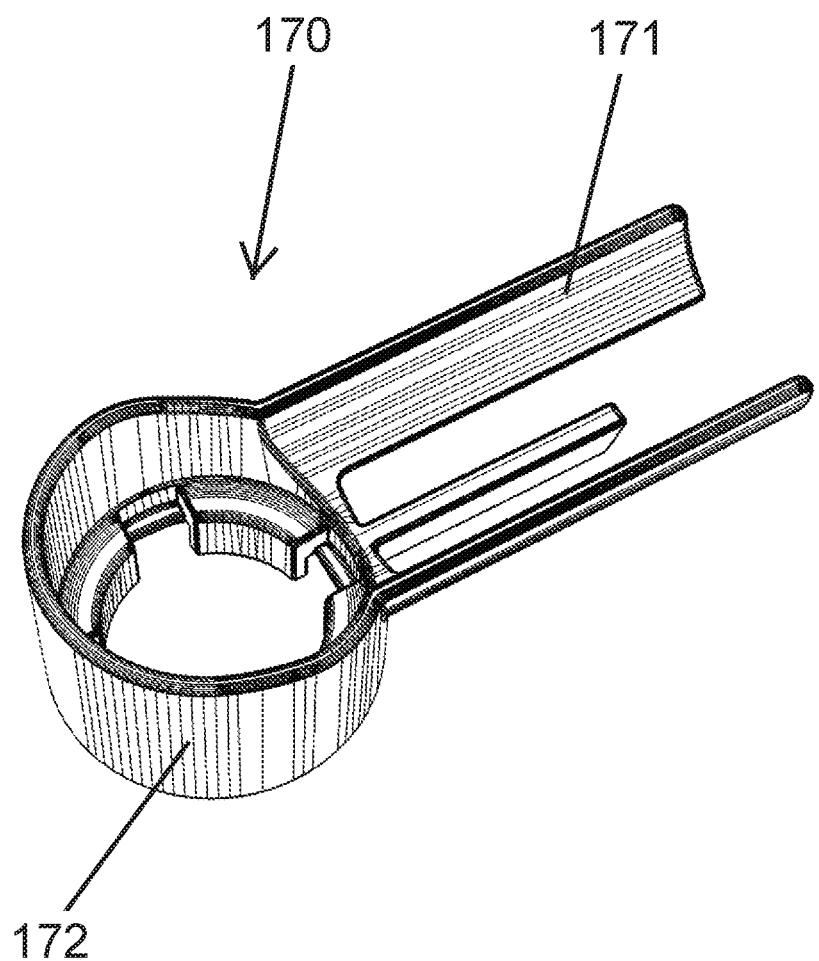
FIG. 12 is a perspective view of a slideable item receiver piece of a slide assembly according to some embodiments.

FIG. 12 is a perspective view of a slideable item receiver piece 170 of slide assembly 120. As shown in this figure, receiver piece 170 comprises a slotted slide portion 171 at one end and a drop tube 172 at the opposite end. The one or more slots in slotted slide portion 171 may be configured to allow a portion of a lift assembly, such as sprocket 182a and/or lift piece 186 of lift assembly 180, to extend into receiver piece 170 such that a ball 105 may be delivered into receiver piece 170. In this manner, as previously alluded to, slideable item receiver piece 170 may be configured to receive balls 105 and deliver them through drop tube 172 into the initial portion of the slide.

Figure 13:
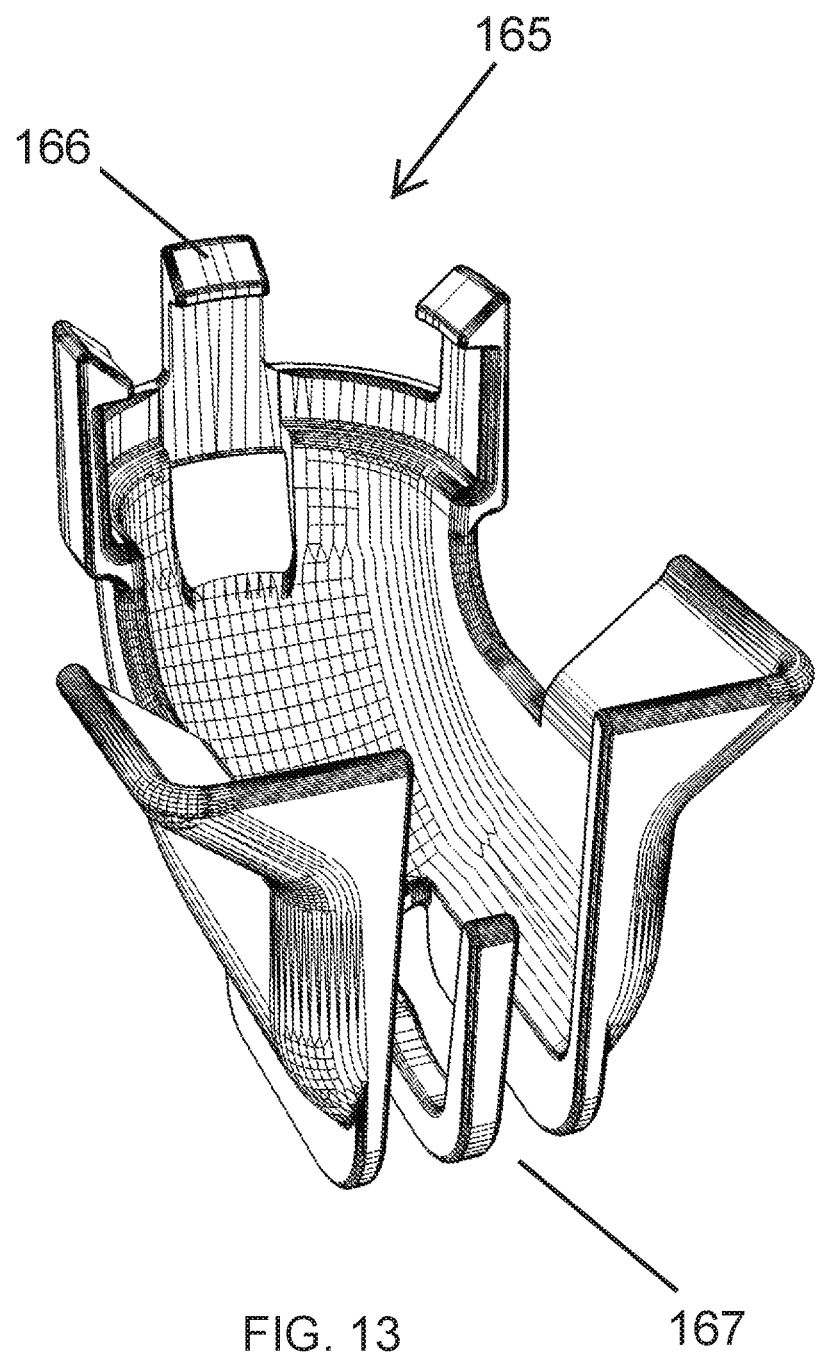
FIG. 13 is a perspective view of a slideable item lift transfer piece of a slide assembly according to some embodiments.

FIG. 13 is a perspective view of a slideable item lift transfer piece 165 of slide assembly 120. Lift transfer piece 165 comprises a plurality of prongs configured to engage drop tube connector piece 160 at one end. At the opposite end, lift transfer piece 165 comprises a slotted bowl 167. As previously mentioned, slotted bowl 167 is configured to retain a single ball 105 to await pick-up by a lift piece 186. Because the specific lift pieces 186 comprise two lift members, as discussed in greater detail below, slotted bowl 167 comprises two slots configured to allow for these lift members to extend therethrough. Of course, those of ordinary skill in the art, after receiving the benefit of this disclosure, will appreciate that a wide variety of alternative configurations are possible. For example, a single larger slot may be provided to receive a larger, single lift member in alternative embodiments.

Figure 14:
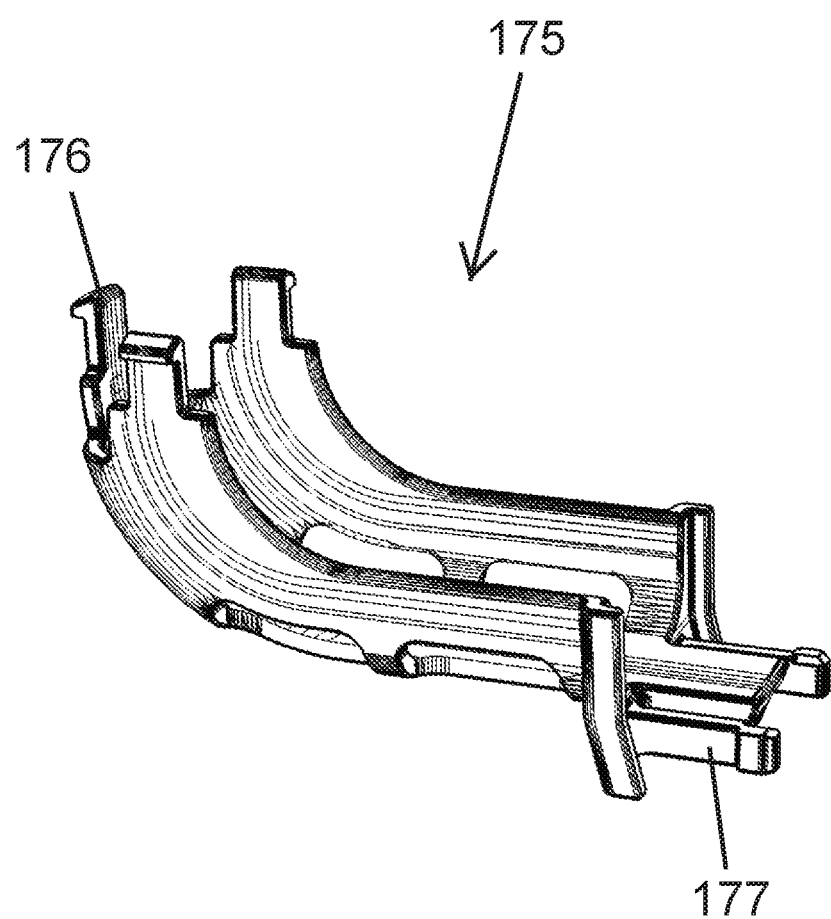
FIG. 14 is a perspective view of an unloading connector piece of a slide assembly according to some embodiments.

FIG. 14 is a perspective view of an unloading connector piece 175 of slide assembly 120. As shown in this figure, unloading connector piece 175 comprises a first means for coupling at one end comprising plurality of prongs/pronged connectors 176 and a second means for coupling at the opposite end comprising a pair of prongs/pronged connectors 177. As previously mentioned, connector piece 175 is configured to be coupled with drop tube 172 of receiver piece 170 at the upper end and with a coupling joint at the lower end.

Figure 15:
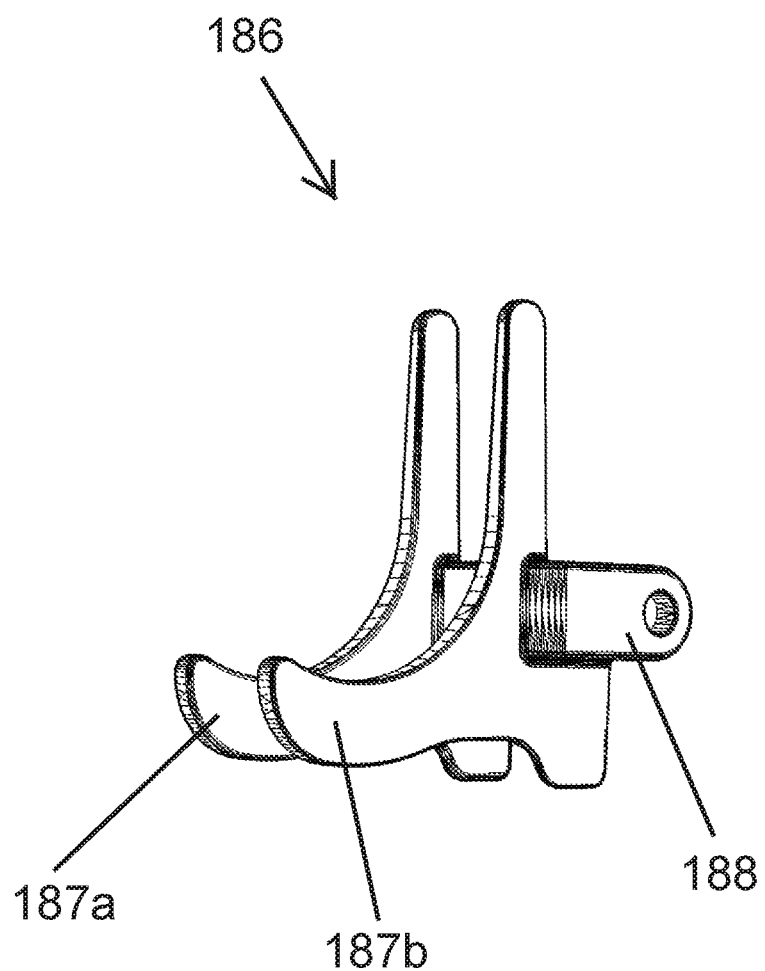
FIG. 15 is a perspective view of a slideable item lift piece of a slide assembly according to some embodiments.

FIG. 15 is a perspective view of a slideable item lift piece 186 of slide assembly 120. As shown in this figure, lift piece 186 comprises a means for lifting comprising first and second lift members 187a and 187b, respectively. Lift members 187a and 187b may be curved and bowl or U-shaped such that a ball 105 or another slideable item may be seated therein while being lifted from a bottom portion to a top portion of an assembled slide. A slot is provided in between lift members 187a and 187b, which may allow for one or more other components and/or portions of assembly 100 to extend therethrough, such as a portion of lift transfer piece 165 and a portion of receiver piece 170. Lift piece 186 further comprises means for coupling with chain 184, which in the depicted embodiment comprises a pair of projecting chain engagement members 188 each having an opening for receiving the tip of a bearing pin of chain 184.

Figure 16:
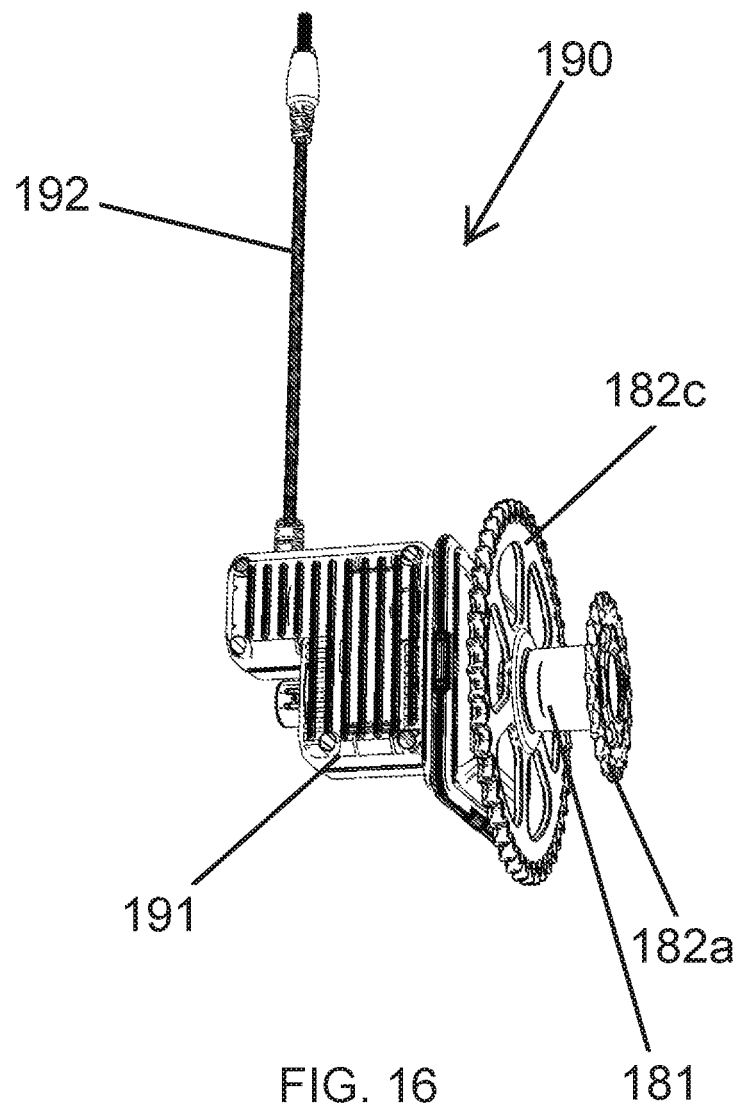
FIG. 16 is a perspective view of a motor assembly of a slide assembly according to some embodiments.

FIG. 16 is a perspective view of a motor assembly 190 of slide assembly 120. As shown in this figure, motor assembly 190 comprises a motor housing 191 containing preferably an electric motor (not shown). A pair of sprockets 182a and 182c may be provided, which may be spaced apart by a spindle 181. Motor assembly 190 may also comprise an antenna 192 to allow for remote-controlled operation in some embodiments. In some embodiments, motor assembly 190 may be configured to operate in two different directions. Preferably, with respect to such embodiments, one or more components of the slide assembly 120 are reversible, such as lift piece 186, to allow for balls 105 to be lifted when the motor is operating in either direction. This feature may expand the number of possible different configurations for construction.

Figure 17:
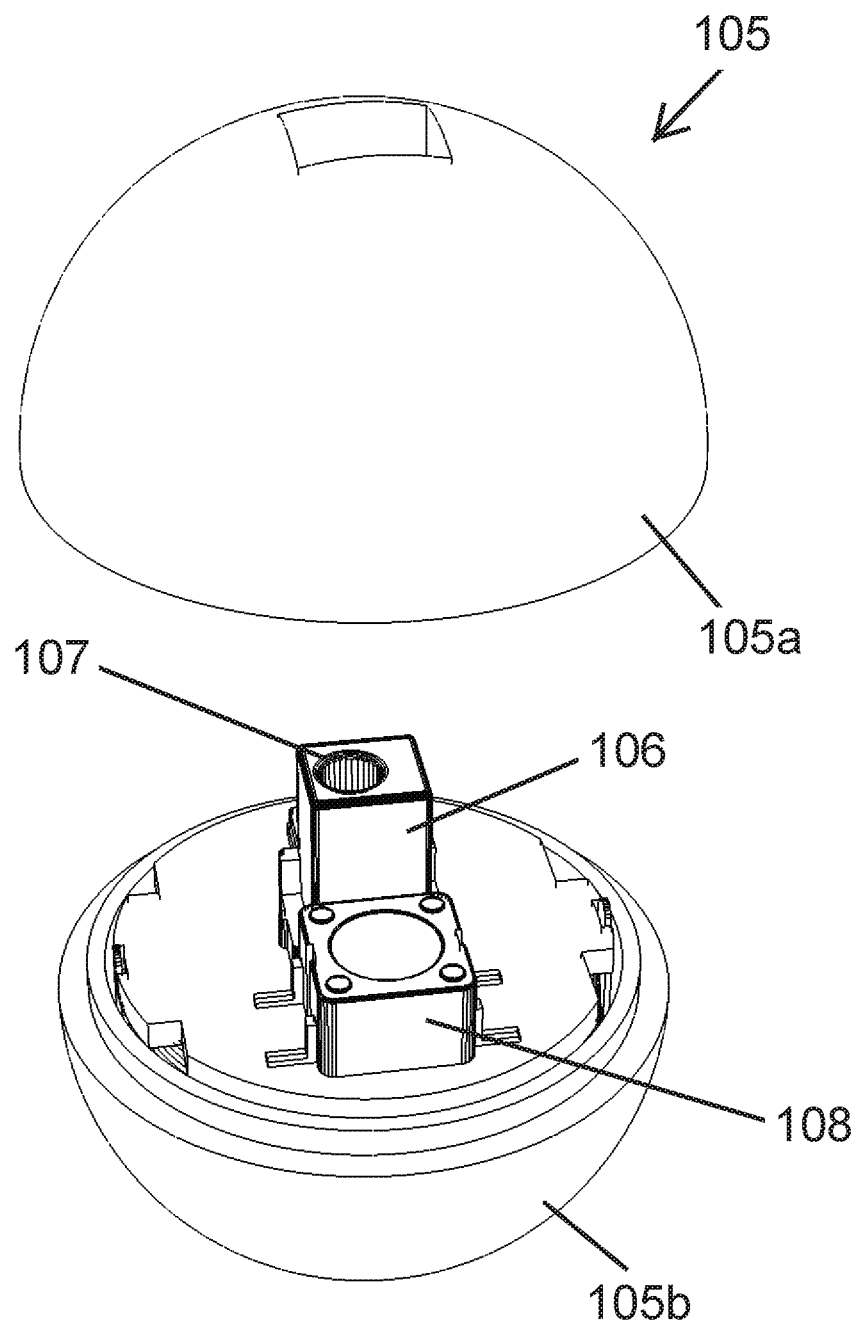
FIG. 17 is an exploded, perspective view of a slideable item, namely, a ball, of a slide assembly according to some embodiments.

FIG. 17 is an exploded, perspective view of one embodiment of a preferred ball 105 of slide assembly 120. Ball 105 comprises two portions, namely, an upper portion 105a and a lower portion 105b that together define an internal chamber for housing various electronic components that may provide for one or more features during use, as explained below.

Ball 105 may comprise a processing assembly 106 comprising, for example, a field programmable gate array (FPGA), a microcontroller, a programmable integrated circuit or other integrated circuit, and/or any other type of processing unit. Processing assembly 106 may further comprise a battery and a slot 107 for receiving a battery recharging cord. Processing assembly 106 may further comprise one or more light sources, such as preferably LED light sources, which may allow ball 105 to light up as it traverses down a path created by slide assembly 120. In preferred embodiments, ball 105 comprises a plurality of LED lights or a multi-colored LED light, such as an RBG LED. In this manner, the balls 105 may be configured to alternate/rotate in color as they roll down a slide created by slide assembly 120. Alternatively, a user may be allowed to select one of a plurality of colors for each of the lights if alternating colors is not desired.

Ball 105 may further comprise a motion sensor and/or switch 108. Motion sensor 108 may be communicatively coupled with processing assembly 106. In this manner, upon detecting motion (e.g., ball 105 is rolling), ball 105 may be configured to automatically actuate a battery and/or one or more LED lights. Similarly, in some embodiments, upon detecting a lack of movement for a predetermined period of time (5-10 seconds, for example), processing assembly 106 may be configured to actuate a switch to terminate power from the battery and thereby turn off each of the LED lights. This configuration may preserve battery life and ensure that the lights only actuate as the balls 105 are in motion. In some embodiments, however, a user may be allowed to flip a switch to keep the lights on irrespective of motion sensed by motion sensor 108.

Figure 19:
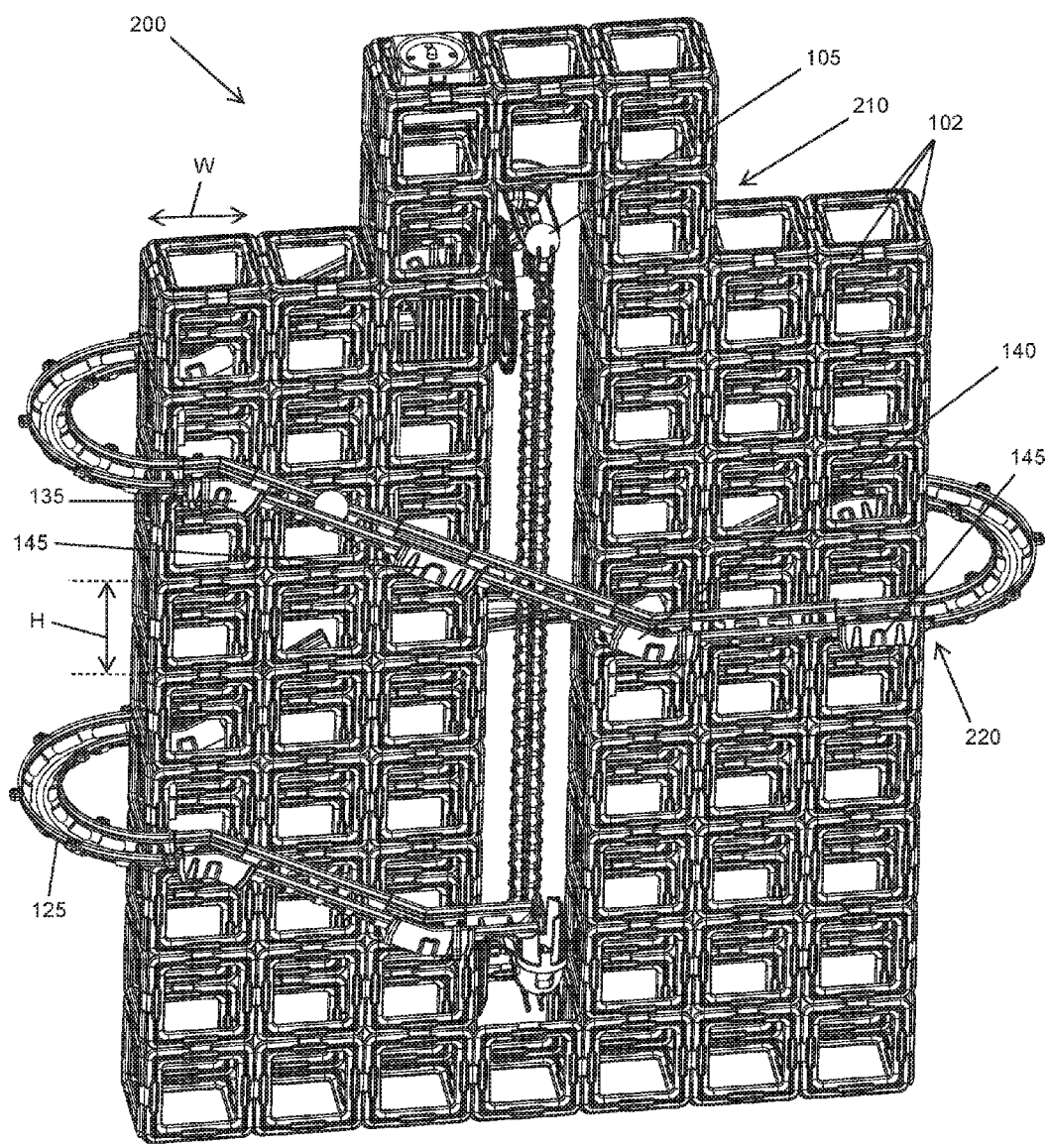
FIG. 19 is a perspective view of the magnetic construction assembly of FIG. 18.

FIG. 18 is a side elevation view of a magnetic construction assembly 200 including a slide assembly 220 and a structure 210 defined by a plurality of magnetic connector pieces according to another embodiment. FIG. 19 is a perspective view of magnetic construction assembly 220. Assembly 200 may be constructed using the same basic construction elements as assembly 100, but FIG. 18 illustrates how some embodiments may allow for various pieces of the slide assembly 220 to extend through an opening 211 in the structure 210 and/or through openings defined by adjacent structures.

FIGS. 18 and 19 also illustrates some additional preferred features regarding how various elements of the structure 210, namely, magnetic connector pieces 102, are configured to be coupled with various elements of slide assembly 220.

More particularly, these figures illustrate how, in some embodiments, one or more of the slide pieces and/or other elements of the slide assembly 220 may be configured to be coupled with the structure/connector pieces 102 such that the slide pieces (such as all non-angled slide pieces, for example) directs the balls 105 or other slideable pieces along the slide along the same location in a vertical direction relative to adjacent structure pieces 102. In some such embodiments, one or more of the slide pieces and/or other elements of the slide assembly may be configured to be coupled with the structure/connector pieces 102 such that the slide pieces (such as all non-angled slide pieces, for example) directs the balls 105 or other slideable pieces along the slide along an at least substantially central position vertically relative to an adjacent structure piece. In some such embodiments, this location may correspond with the center of an opening formed within the adjacent structure piece.

For example, as best seen in FIG. 18, the assembled slide is configured to direct balls 105 horizontally such that the top surfaces of balls 105 are at least approximately centered in the vertical or "Y" direction relative to the central openings in magnetic connector pieces 102. In some embodiments, this may be accomplished by ensuring that at least a subset (in some embodiments, all) of the coupling joints (e.g., coupling joints 135, 140, and/or 145) are positioned at the same location, or at least substantially the same location (close enough to allow for a common coupling point), relative to the adjacent connector pieces 102 in a vertical direction. In some such embodiments, this location may be the center, or at least approximately the center, of the adjacent connector pieces. For example, as shown in FIG. 18, distance D2 may be ½, or at least approximately ½, of the height H of the connector pieces 102.

In some embodiments, at least a subset of the coupling joints (e.g., coupling joints 135, 140, and/or 145) may also, or alternatively, be positioned at the same location in one or both horizontal dimensions (i.e., distance D3 and/or distance D1 from FIG. 4) relative to adjacent connector pieces 102. Thus, in embodiments in which connector pieces 102 comprise squares, distance D3 may be equal to distance D2 and may be ½ of the height H and the width W of connector pieces 102. In some embodiments, the distance of one or more of the coupling joints (i.e., D1) may also be equal to ½ of the height H and/or width W. Preferably, at least the angled coupling joints (coupling joints 135 and 140) are positioned at the same location in one or more dimensions relative to adjacent connector pieces 102. However, as shown in FIG. 18, in some embodiments, even the non-angled coupling joints 145 may be positioned at this location.

By providing one or more of these features, the connector pieces 102 may be configured to operate in conjunction with the elements of the slide assembly (120/220) so that a user may assemble the various parts in a variety of different ways and directions without losing the ability to couple the slide to a structure. By providing a consistent coupling location, and preferably by providing a set of similarly-shaped construction elements, such as squares configured to generate cubic construction elements, a user may assemble various slides and structures as a game or puzzle without becoming frustrated by being unable to couple the elements together in a rigid and relatively predictable manner.

Figure 20:
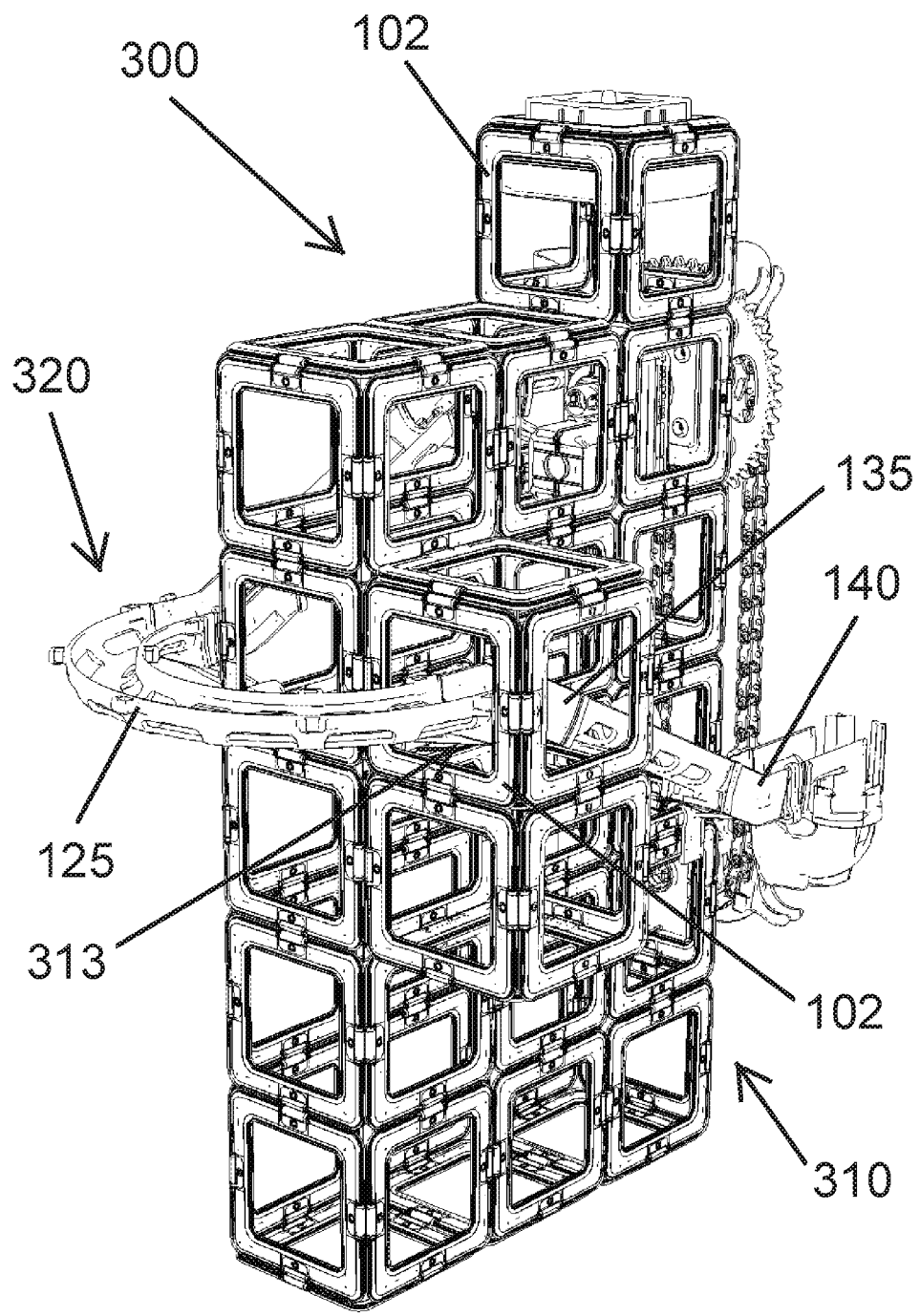
FIG. 20 is a perspective view of a magnetic construction assembly including a slide assembly and a structure defined by a plurality of magnetic connector pieces according to another embodiment illustrating how some embodiments may allow for various pieces of the slide assembly to extend through openings formed in the individual connector pieces.

FIG. 20 illustrates another possible feature provided by arranging the slide pieces and the structure pieces together with consistent spacing in some embodiments. This figure is a perspective view of a magnetic construction assembly 300 including a slide assembly 320 and a structure 310 defined by a plurality of magnetic connector pieces according to another embodiment. Assembly 300 may be constructed using the same basic construction elements as assemblies 100 and 200, but FIG. 20 illustrates how some embodiments may allow for various pieces of the slide assembly 220 to extend through an opening 313 formed in one of the individual magnetic connector pieces 102. As also shown in this figure, the dimensional constraints of the elements of structure 310 and slide assembly 320 may also allow the slide to extend all of the way through a three-dimensional block or other construction element formed by a plurality of magnetic connector pieces. In some embodiments, of course, the slide may extend through multiple such blocks.

In addition, although the slide may extend straight through both opposing openings of the opposing magnetic connector pieces 102 of one or more three-dimensional construction cubes/boxes/elements, as also shown in FIG. 20, in some embodiments, an angled coupling joint, such as coupling joint 135, may be positioned inside of such a three-dimensional construction cube/box/element, such that the slide may begin angling from within the three-dimensional construction cube/box/element. This feature may be provided by, as previously discussed, centering at least a portion of the slide pieces, or at least a portion of at least a subset of the slide pieces, relative to adjacent magnetic connector pieces 102 in one or more dimensions (preferably at least the vertical dimension illustrated by H in FIG. 18). As also shown in FIG. 20, the coupling joint 135 is centered within the three-dimensional cube formed by six adjacent magnetic connector pieces 102.

Those having skill in the art will appreciate that many changes may be made to the details of the above-described embodiments without departing from the underlying principles of the invention. For example, while the principles of this disclosure have been shown in various embodiments, many modifications of structure, arrangements, proportions, elements, materials, shapes, thicknesses, widths, heights, and components, may be used without departing from the principles and scope of this disclosure. These and other changes or modifications are intended to be included within the scope of the present disclosure. The scope of the present inventions should, therefore, be determined only by the following claims.

The invention claimed is:

1. A magnetic toy construction assembly, comprising:
   a plurality of magnetic connector pieces, wherein each of the plurality of magnetic connector pieces is configured to be magnetically coupled with at least one adjacent magnetic connector piece so as to allow for construction of a structure; and
   a slide assembly configured to be coupled with the structure, wherein the slide assembly comprises:
      a plurality of slide pieces configured to be coupled together so as to define a slide configured to receive and direct one or more slideable pieces therein; and
      a plurality of slide coupling members configured to couple at least a subset of the plurality of slide pieces to at least a subset of the plurality of magnetic connector pieces to allow the slide to be positioned adjacent to the structure, wherein the plurality of slide pieces comprises:
         one or more angled slide pieces configured to direct the one or more slideable pieces downward;
         one or more non-angled slide pieces configured to direct the one or more slideable pieces therein laterally; and
         a plurality of coupling joints each configured to couple a first slide piece of the plurality of slide pieces to a second slide piece of the plurality of slide pieces, wherein each of the plurality of coupling joints is configured to be at least substantially centered in at least two dimensions with respect to an adjacent magnetic connector piece following assembly.

2. The magnetic toy construction assembly of claim 1, wherein at least a subset of the plurality of coupling joints is configured to couple a first angled slide piece of the one or more angled slide pieces with a first non-angled slide piece of the one or more non-angled slide pieces.

3. The magnetic toy construction assembly of claim 1, wherein the one or more slideable pieces comprise balls configured to roll within the slide.

4. The magnetic toy construction assembly of claim 3, wherein each of the balls comprises a light, wherein each of the balls further comprises a motion sensor coupled with the light, and wherein the motion sensor is configured to activate the light while the ball is in motion within the slide.

5. The magnetic toy construction assembly of claim 1, wherein at least a subset of the plurality of magnetic connector pieces comprises an opening.

6. The magnetic toy construction assembly of claim 5, wherein each of the plurality of coupling joints is configured to be at least substantially centered in at least two dimensions with respect to an opening of an adjacent magnetic connector piece following assembly.

7. The magnetic toy construction assembly of claim 6, wherein the opening comprises a rectangular opening.

8. The magnetic toy construction assembly of claim 1, wherein at least a subset of the plurality of magnetic connector pieces comprises a square shape, and wherein each of the plurality of magnetic connector pieces comprising a square shape is configured to be magnetically coupled with adjacent magnetic connector pieces so as to define cube-shaped construction pieces for the structure.

9. A toy construction assembly, comprising:
   a structure comprising a plurality of openings formed therein; and
   a slide assembly configured to be coupled with the structure, wherein the slide assembly comprises:
      a plurality of slide pieces configured to be coupled together so as to define a slide configured to receive and direct one or more slideable pieces therein; and
      a plurality of slide coupling members configured to couple at least a subset of the plurality of slide pieces to the structure to allow the slide to be positioned adjacent to the structure, wherein the plurality of slide pieces comprises a plurality of coupling joints configured to couple two adjacent slide pieces of the plurality of slide pieces together, and wherein each of the plurality of coupling joints is configured to be at least substantially centered in at least one dimension with respect to an adjacent opening of the plurality of openings upon being coupled with the structure.

10. The toy construction assembly of claim 9, wherein the structure is defined by a plurality of connector pieces, wherein each of the plurality of connector pieces is configured to be coupled with at least one adjacent connector piece to define the structure.

11. The toy construction assembly of claim 10, wherein each of at least a subset of the plurality of connector pieces comprises a magnetic connector piece.

12. The toy construction assembly of claim 9, wherein the one or more slideable pieces comprise balls.

13. The toy construction assembly of claim 12, wherein the structure is defined by a plurality of connector pieces, wherein each of the plurality of connector pieces is configured to be coupled with at least one adjacent connector piece to define the structure, and wherein the plurality of coupling joints comprises:
   a first subset of coupling joints configured to direct a ball down an angled slide piece; and
   a second subset of coupling joints configured to receive a ball from an angled slide piece, wherein each of the coupling joints of the first subset and the second subset is configured to be coupled with an adjacent connector piece such that a center point or sharp transition point of a curve defined by the coupling joint is positioned at the same point relative to an adjacent connector piece of the structure.

14. The toy construction assembly of claim 13, wherein each of the coupling joints of the first subset and the second subset is configured to be coupled with an adjacent connector piece such that at least a portion of a ball positioned at the center point or sharp transition point is positioned at a central location relative to an adjacent connector piece of the structure.

15. The toy construction assembly of claim 9, wherein each of at least a subset of the plurality of coupling joints is configured to be at least substantially centered in at least two dimensions with respect to an adjacent opening of the plurality of openings upon being coupled with the structure.

16. A toy construction assembly, comprising:
a structure defined by a plurality of structure pieces; and
a slide assembly configured to be coupled with the structure, wherein the slide assembly comprises:
a plurality of slide pieces configured to be coupled together so as to define a slide configured to receive and direct one or more slideable pieces therein; and
a plurality of slide coupling members configured to couple the slide assembly to the structure, wherein the plurality of slide coupling members comprises:
one or more angled slide pieces configured to direct the one or more slideable pieces downward; and
a plurality of non-angled slide pieces configured to direct the one or more slideable pieces therein laterally, wherein each of the plurality of non-angled slide pieces is configured to be coupled with the structure such that each of the plurality of non-angled slide pieces directs the one or more slideable pieces along the slide in an at least substantially vertically central position relative to an adjacent structure piece.

17. The toy construction assembly of claim 16, wherein each of the one or more angled slide pieces is configured to be coupled with an adjacent non-angled slide piece of the plurality of non-angled slide pieces at an at least substantially central location in at least two dimensions with respect to a structure piece of the plurality of structure pieces.

18. The toy construction assembly of claim 17, wherein each of the one or more angled slide pieces is configured to be coupled with an adjacent non-angled slide piece of the plurality of non-angled slide pieces at an at least substantially central location in three dimensions with respect to a structure piece of the plurality of structure pieces.

19. The toy construction assembly of claim 17, wherein the structure is defined by a plurality of magnetic connector pieces, wherein each of the plurality of magnetic connector pieces is configured to be magnetically coupled with at least one adjacent magnetic connector piece so as to allow for construction of the structure, wherein each of the plurality of magnetic connector pieces comprises an opening, and wherein each of the one or more angled slide pieces is configured to be coupled with an adjacent non-angled slide piece of the plurality of non-angled slide pieces at an at least substantially central location with respect to an opening of an adjacent magnetic connector piece upon being coupled with the structure.

20. The toy construction assembly of claim 16, wherein the slide assembly and the structure pieces are configured such that at least a subset of the slide pieces are configured to be positioned at a consistent distance from an adjacent structure piece of the plurality of structure pieces upon assembly.

* * * * *